Nov. 4, 1969     R. A. FULLER ET AL     3,475,877
PACKING APPARATUS
Filed Oct. 24, 1965     14 Sheets-Sheet 4
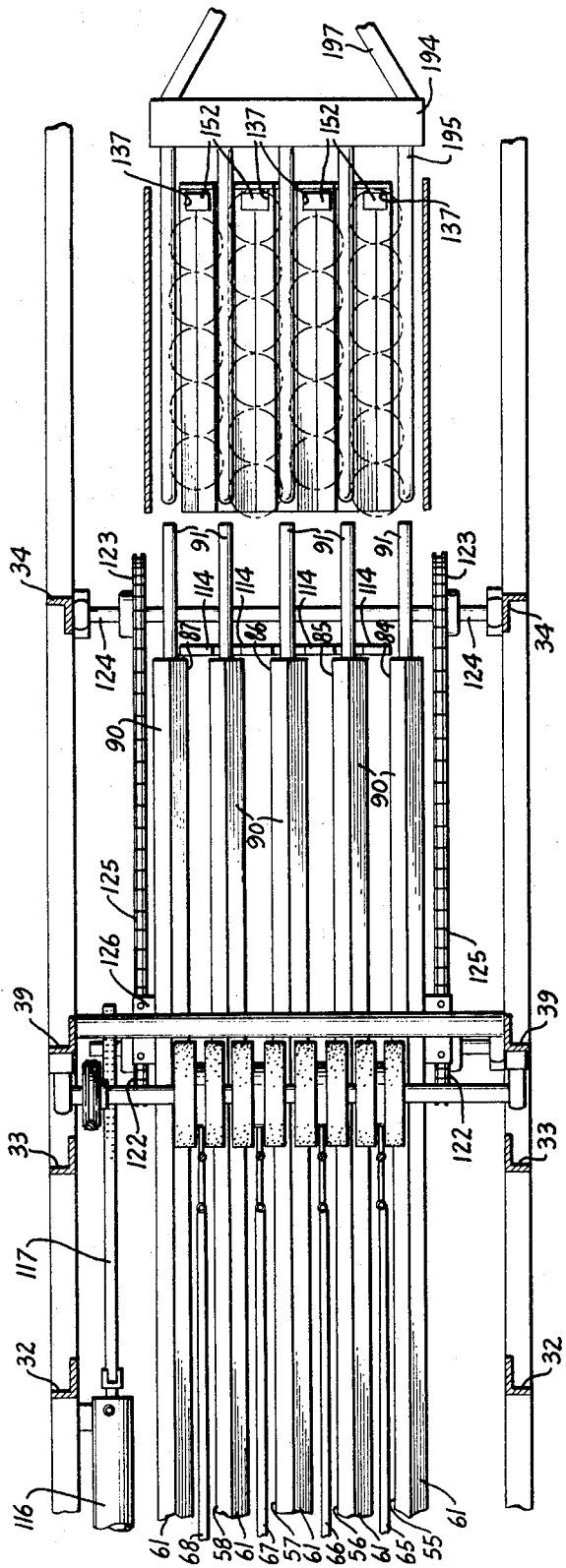
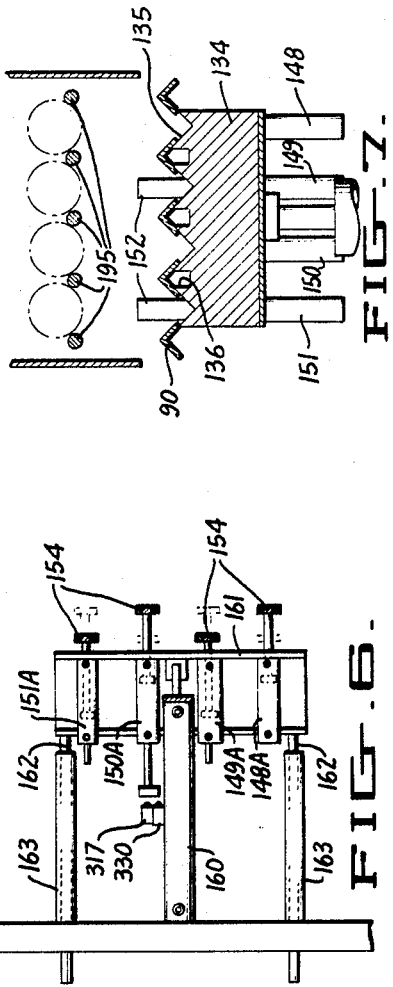
INVENTORS
RALPH A. FULLER
BY EARL D. SNODGRASS
*Naylor & Neal*
ATTORNEYS INVENTORS
RALPH A. FULLER
EARL D. SNODGRASS
BY Naylor + Neal
ATTORNEYS

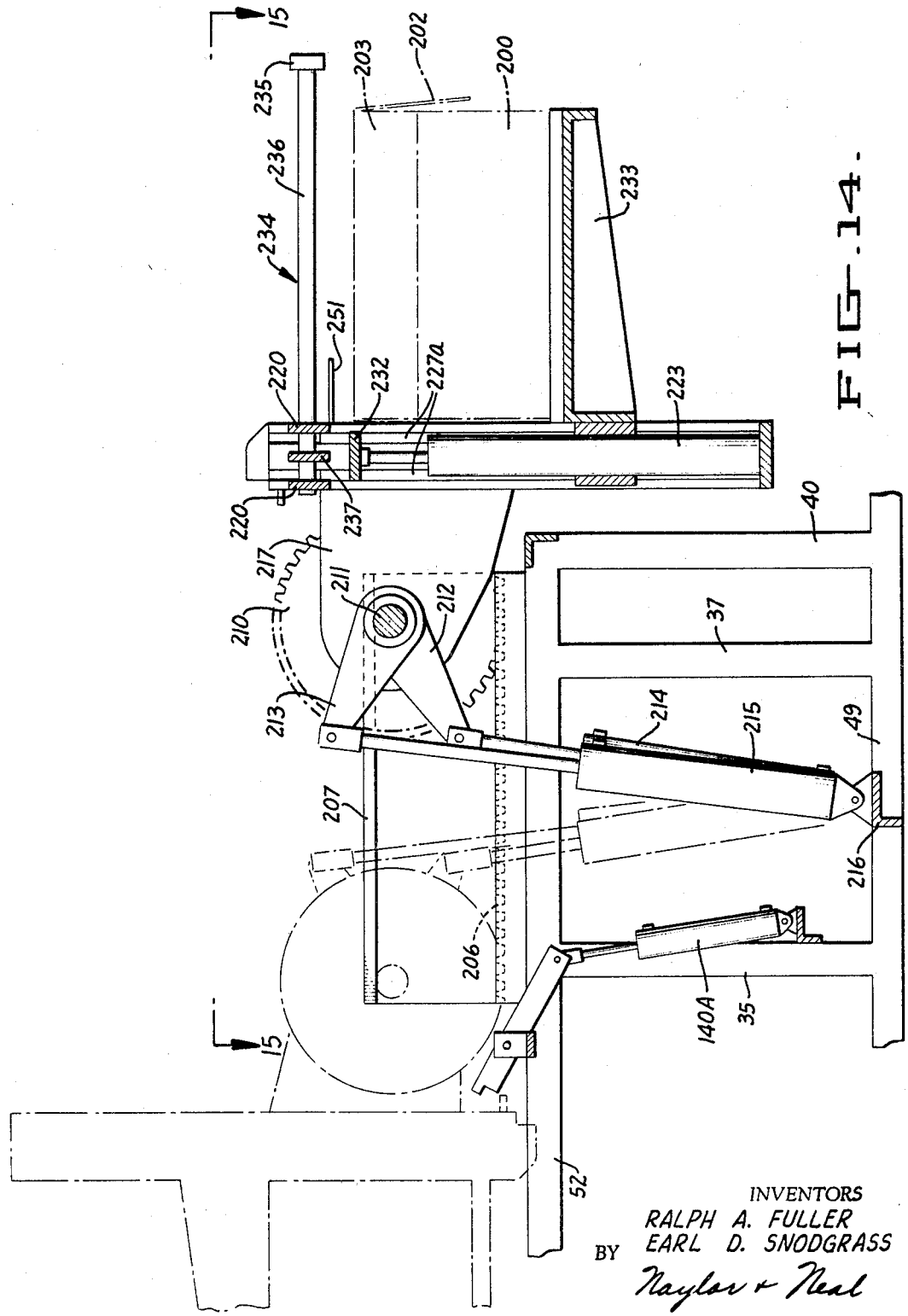

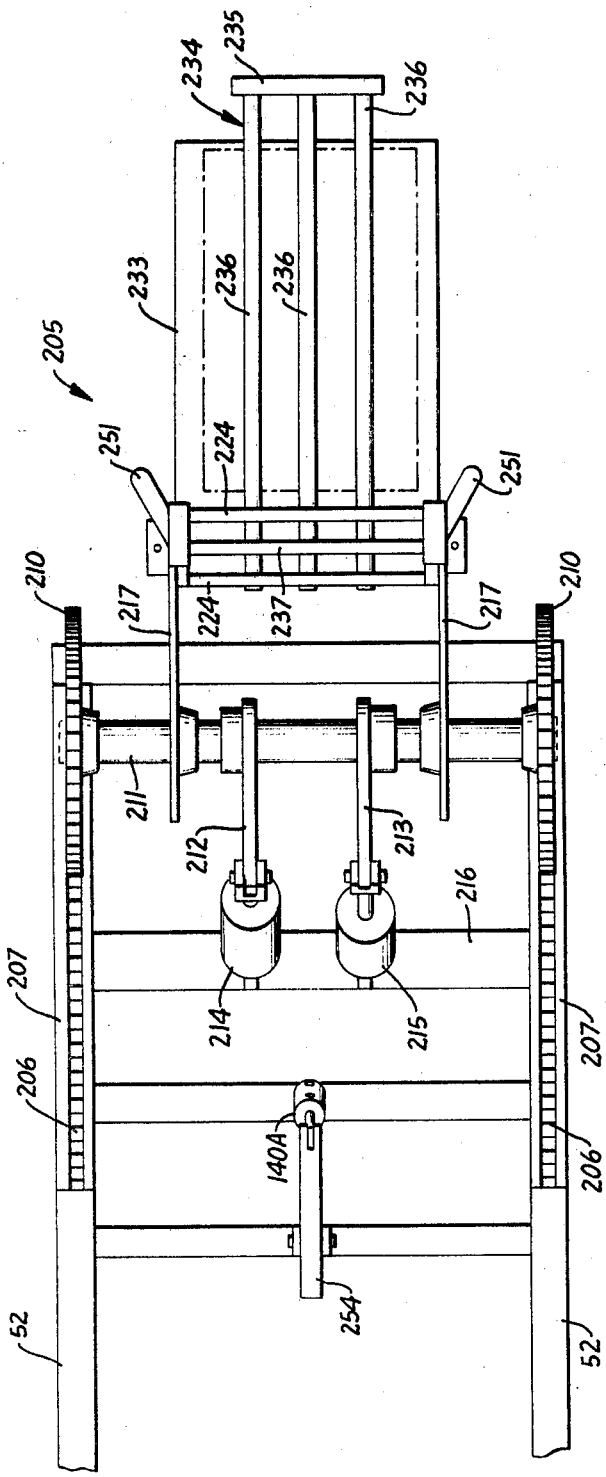

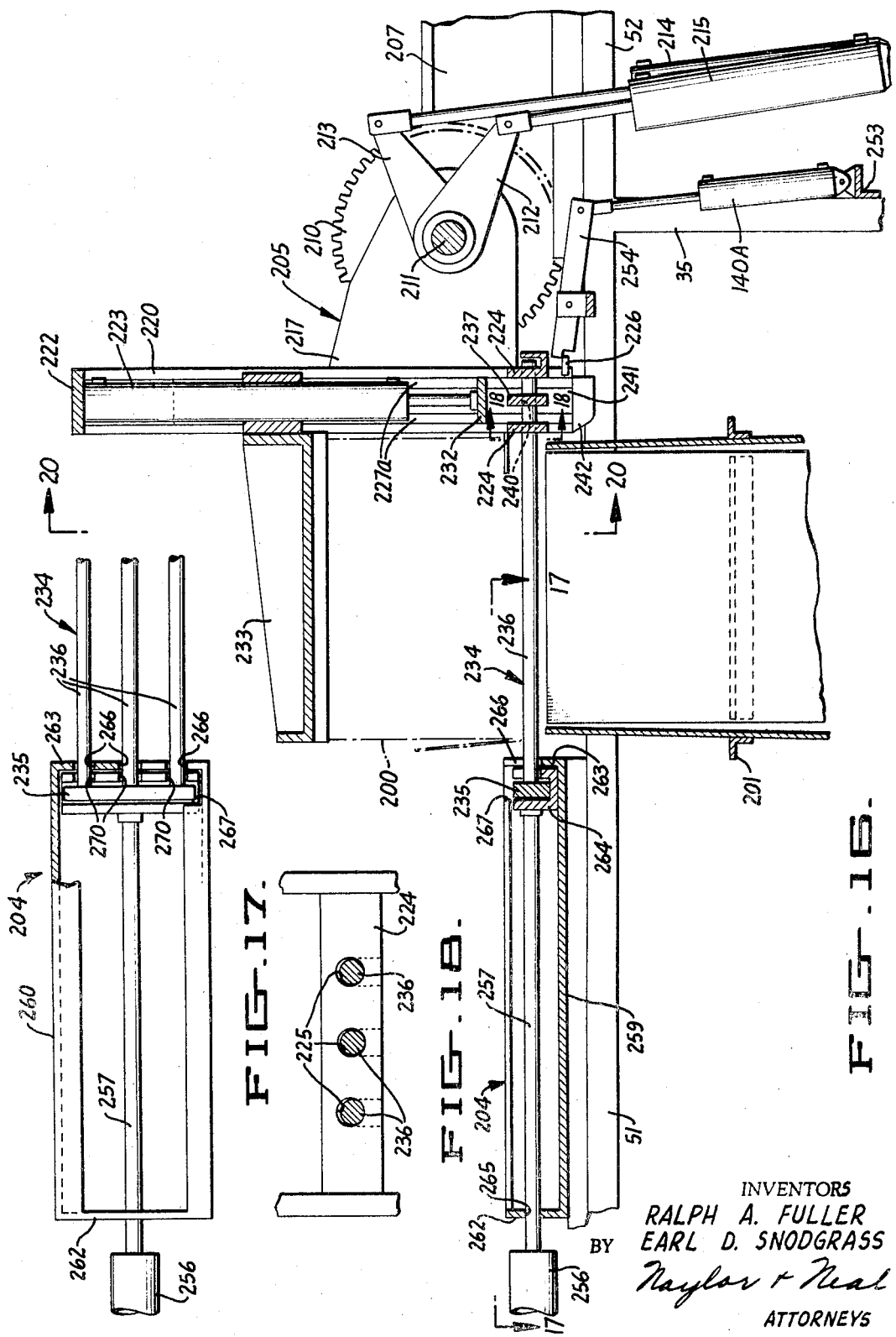

INVENTORS
RALPH A. FULLER
EARL D. SNODGRASS
BY
Naylor + Neal
ATTORNEYS

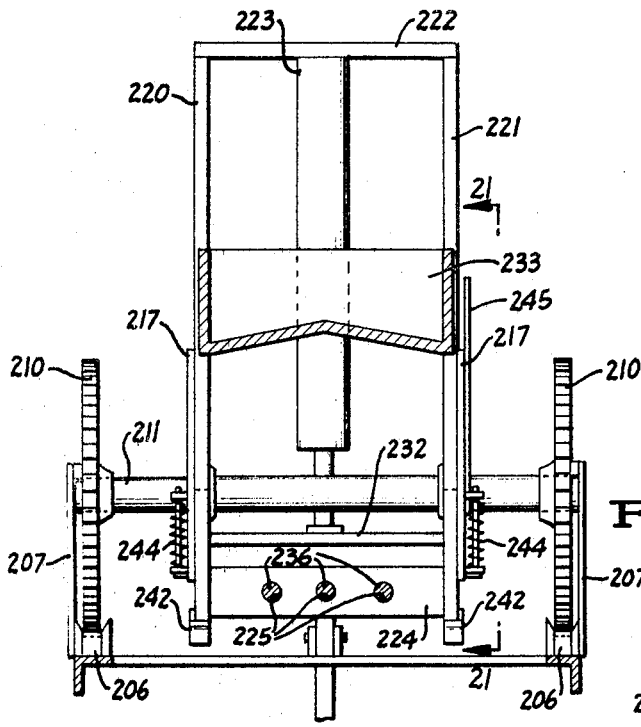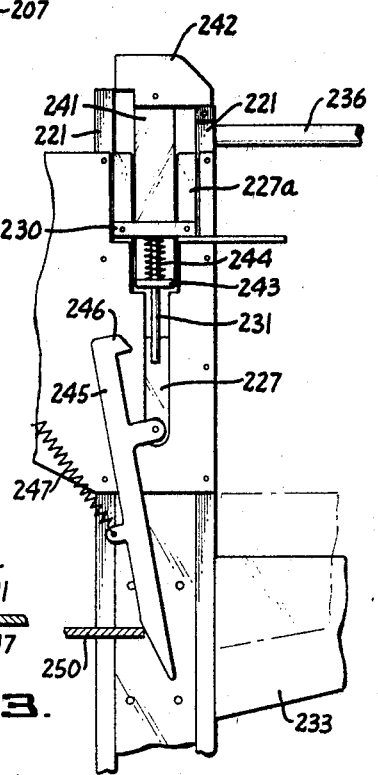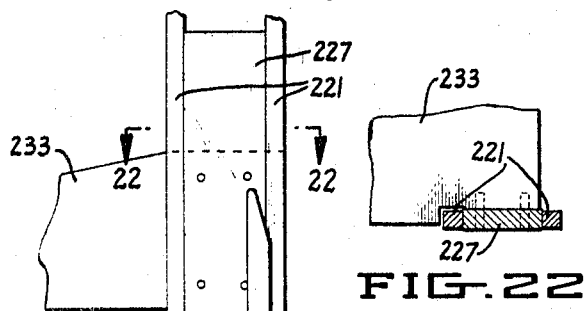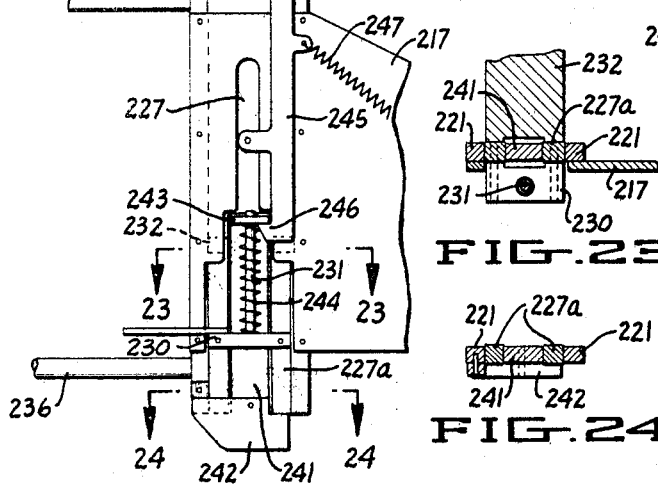

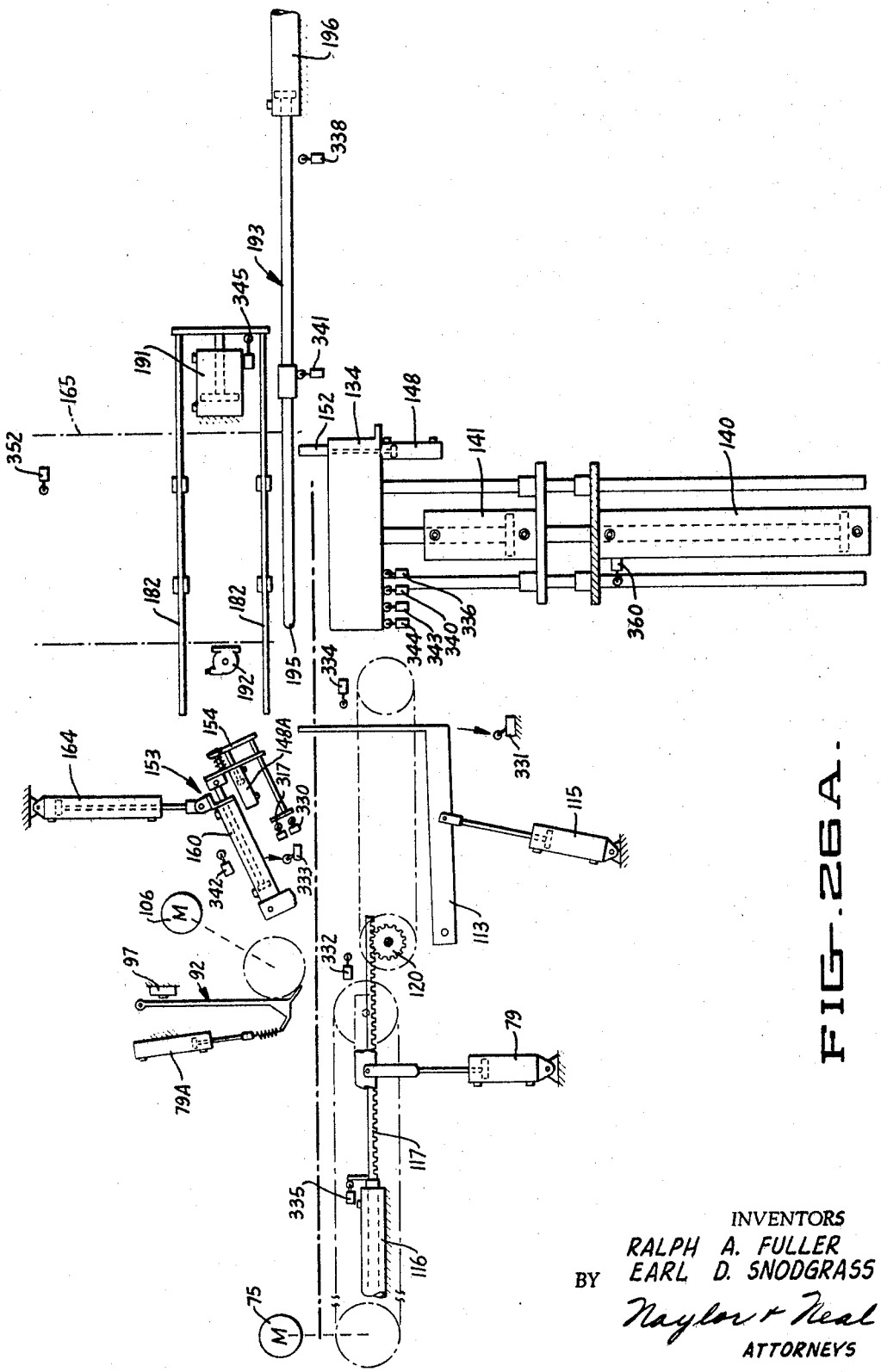

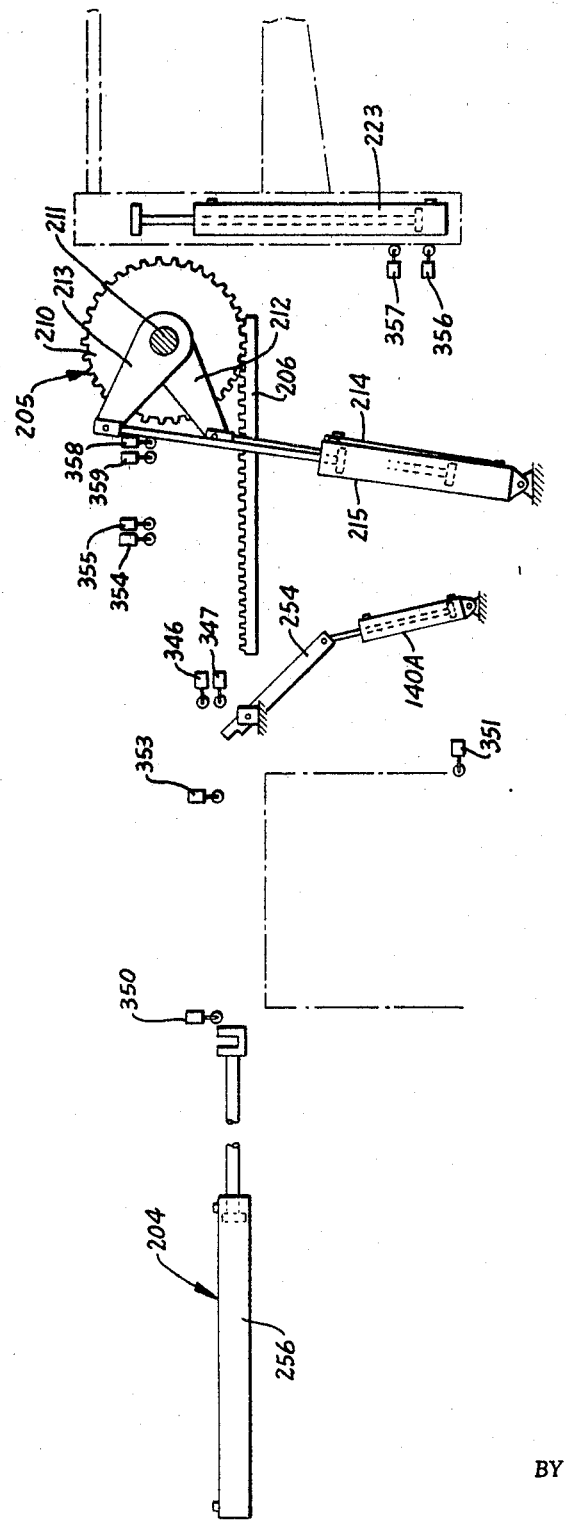

United States Patent Office 3,475,877
Patented Nov. 4, 1969

3,475,877
PACKING APPARATUS
Ralph A. Fuller, Exeter, and Earl D. Snodgrass, Lindsay, Calif., assignors to Herrick Waterman, Ralph A. Fuller, and Earl D. Snodgrass, Exeter, Calif., a joint venture
Filed Oct. 24, 1965, Ser. No. 504,858
Int. Cl. B65b 25/04, 5/10, 35/52
U.S. Cl. 53—26                                28 Claims

ABSTRACT OF THE DISCLOSURE

A machine for packing oranges and the like comprising a feed section, an orientation and pack section and a press-out section. The feed section comprises a conveyor-like apparatus adapted to receive bulk quantities of oranges and direct them into rows of a predetermined count. The orientation and pack section comprises a mechanism to receive the rows of oranges from the feed section and direct them into layers. During each cycle of the machine, a plurality of layers are formed in the orientation and pack section, directed into parallel abutting relationship, and laterally confined in a tight pack. The press-out section comprises, in part, a plunger-like mechanism adapted to displace the confined layers of oranges from the orientation and pack section into a carton-like container. In the preferred embodiment, the carton is packed in an inverted position and a roll-over mechanism is provided to invert the carton to an upright position after it is packed.

---

The present invention relates to an apparatus and method to effect the packing of plural articles in carton type containers and more particularly is directed to such an apparatus and method adapted to automatically effect the packing of fruit. In its more specific aspects, the invention is directed to an apparatus and method to effect the "place packing" of oranges in layers comprised of staggered rows.

In the prior art, various efforts have been made to devise apparatuses and methods whereby articles, such as oranges or other fruits, could be automatically or semi-automatically packed into containers. These efforts have not, however, proved to be commercially successful. As a result, the majority, if not all, of fruit packing today is effected largely by hand. This is especially true of the orange packing industry.

Prior efforts to effect automatic place packing have proved commercially unacceptable for various reasons. Prime among these reasons is that fruit handling in prior efforts could not be effectively accomplished without imparting damage to the fruit. Another reason is that fruit, or other articles, could not be systematically packed in a predetermined orientated fashion. Still another reason is that packing could not be effected with sufficient speed to make these efforts economically feasible. In any particular prior art effort, these shortcomings might be combined with and accompanied by related problems.

It is, accordingly, a principal object of the present invention to provide a method and apparatus to effect the automatic place packing of articles, and particularly fragile articles.

Another object of the invention is to provide a method and apparatus to effect the packing of articles in layers having a predetermined orientation and count.

With respect to the latter object, it is another and related object to provide such a method and apparatus facilitated to pack the articles in layers comprised of staggered rows.

Still another and more specific object of the invention is to provide a method and apparatus facilitated to pack such layers in juxtaposition wherein the opposed rows of respective layers are staggered relative to each other.

A further object of the invention is to provide a method and apparatus facilitated to compress such juxtaposed layers without injury to the articles therein.

Yet another object of the invention is to provide a method and apparatus to pack such compressed layers into containers without materially disturbing the compressed or orientated state thereof.

The packing method of the present invention basically comprises a plurality of sequential steps. The first of these steps comprises forming a first layer of articles by the technique of: feeding the articles into a plurality of rows; counting the articles fed into each row; limiting the number of articles fed into each row responsive to the number of articles counted thereinto to establish a predetermined article count in each row; directing the articles into a coplanar orientation wherein said rows are parallel; and, positioning each of said rows so that the articles therein are staggered with respect to the articles in the rows adjacent thereto. The second step comprises forming a second layer through a technique corresponding to that used for the formation of the first layer and directing and positioning this second layer so that the rows thereof are opposed and parallel to the first layer with the articles in each row being staggered relative to those opposed thereto. The third step comprises confining the layers within lateral boundaries so as to force the articles therein towards each other. The fourth and final step of the basic method comprises ejecting the articles into a container having interior surfaces defining boundaries corresponding substantially to the lateral boundaries within which the layers were confined.

The basic apparatus of the invention is conveniently divided into an article feed section; an article orientation and pack section; and, an article press-out section. As will be seen from the subsequent detailed description, these sections cooperate to automatically form and pack layers of articles into carton like containers.

The foregoing and other objects and the details of the invention will become more apparent when viewed in light of the following description and accompanying drawings illustrating a preferred machine embodiment of the invention, wherein.

Figure 2:
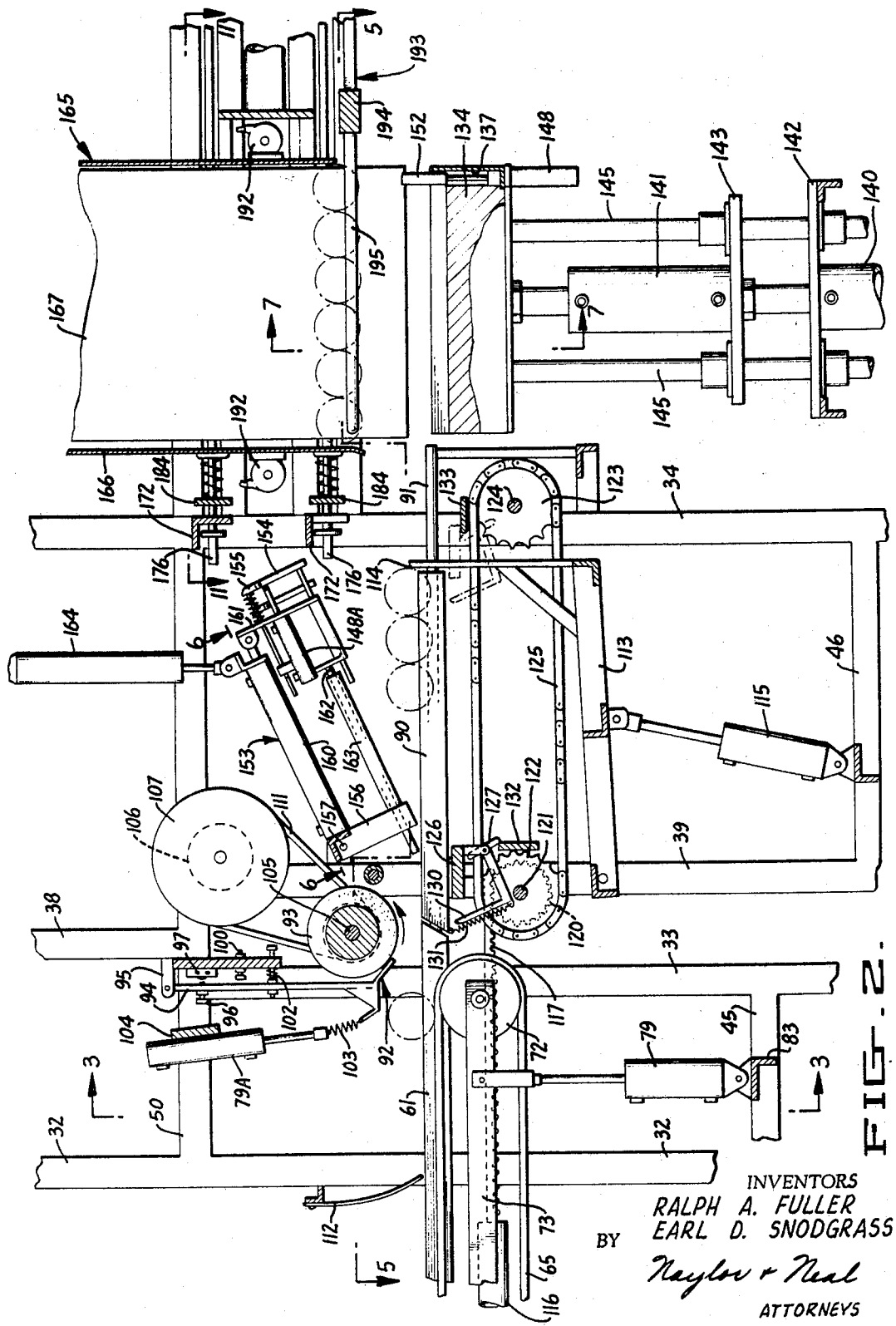
FIG. 2 is a sectional side elevational view, with parts broken away, showing the machine of FIG. 1 during the counting operation.

FIGS. 5, 6 and 7 are sectional views taken on planes 5—5, 6—6 and 7—7, respectively, of FIG. 2.

Figure 8:
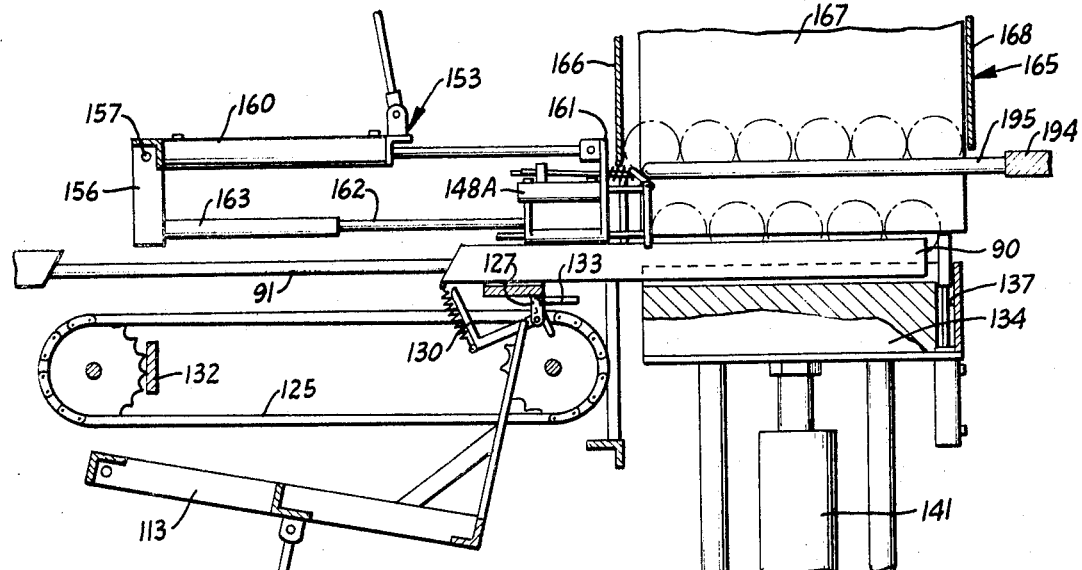

FIG. 8 is a sectional side elevational view similar to FIG. 2, with parts broken away, showing the machine in the process of transporting counted rows of articles to the article orientation and pack section thereof.

Figure 9:
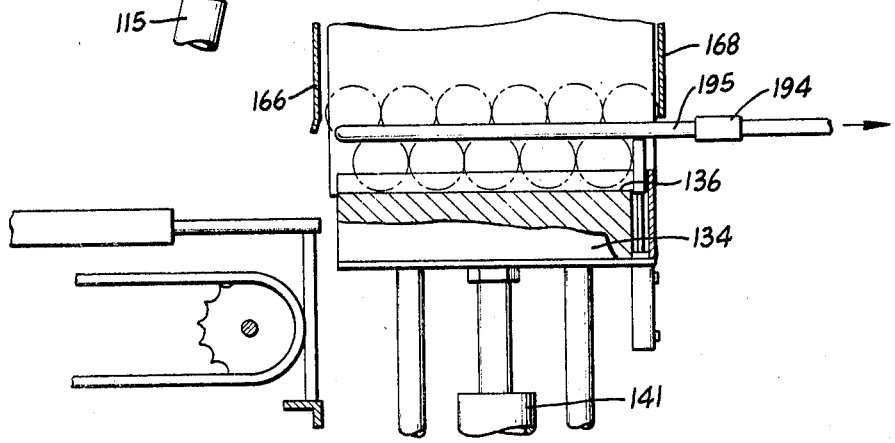

FIG. 9 is a sectional side elevational view similar to FIG. 8, with parts broken away, showing the article orientation and pack section of the machine in the first stage of displacing a layer of articles transferred thereto upwardly.

Figure 10:
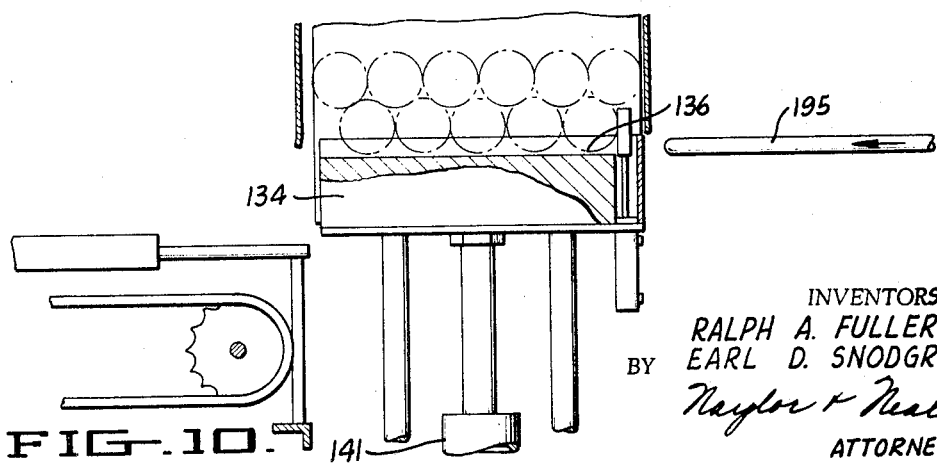

FIG. 10 is a sectional side elevational view similar to FIGS. 8 and 9, with parts broken away, showing the article orientation and pack section in the second stage of displacing layers of articles transferred thereto upwardly.

Figure 11:
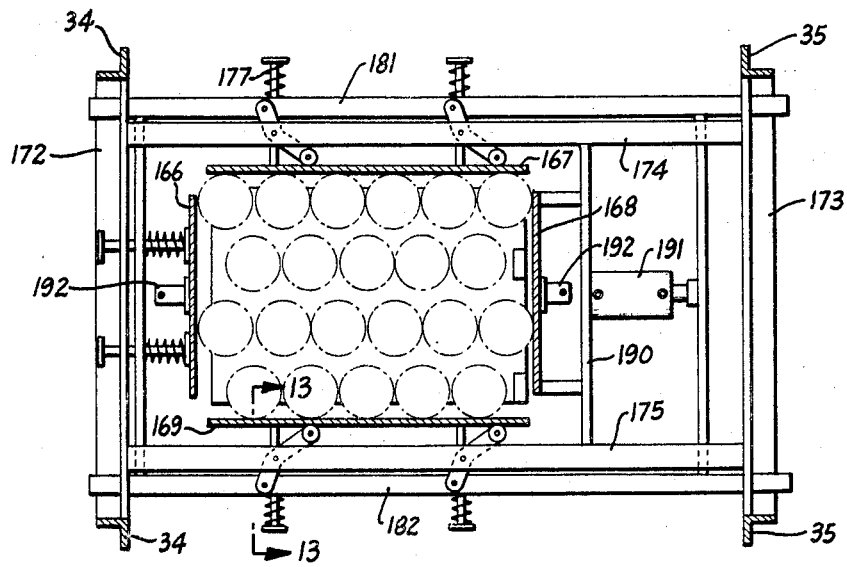

FIG. 11 is a sectional plan view showing the article orientation and pack section of the machine upon the displacement of articles thereinto as illustrated in FIG. 10.

Figure 12:
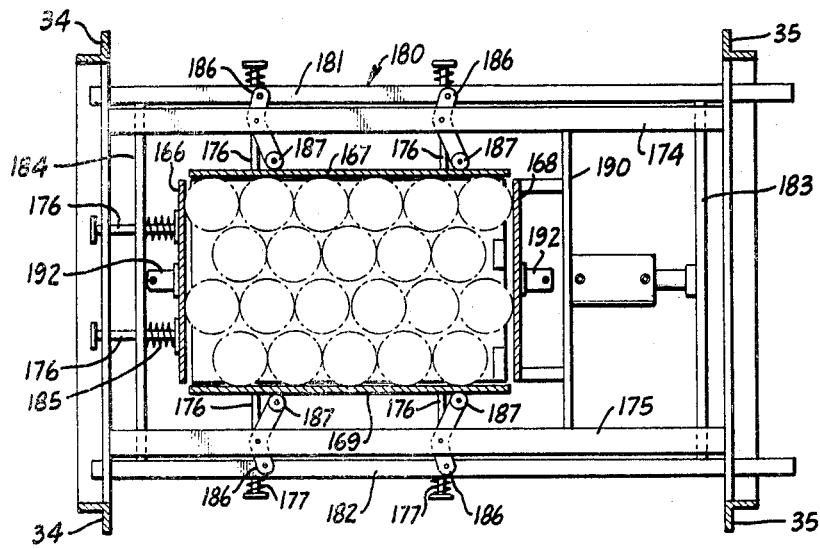

FIG. 12 is a sectional plan view showing the article orientation and pack section in the process of compressing articles received therein.

Figure 13:
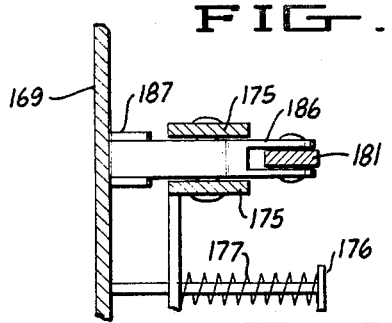

FIG. 13 is a sectional view taken on plane 13—13 of FIG. 11.

FIG. 14 is a sectional side elevational view, with parts broken away, showing the container roll-over mechanism associated with the article press-out section. In this figure, the solid lines illustrate the container fixture in the unloading position and the phantom lines show the container in the pre-load position.

FIG. 15 is a plan view taken on plane 15—15 of FIG. 14.

FIG. 16 is a sectional side elevational view, similar to FIG. 14, illustrating the roll-over mechanism associated with the article press-out section in the carton supporting pre-load position.

FIGS. 17 and 18 are sectional views taken on planes 17—17 and 18—18, respectively, of FIG. 16.

Figure 19:
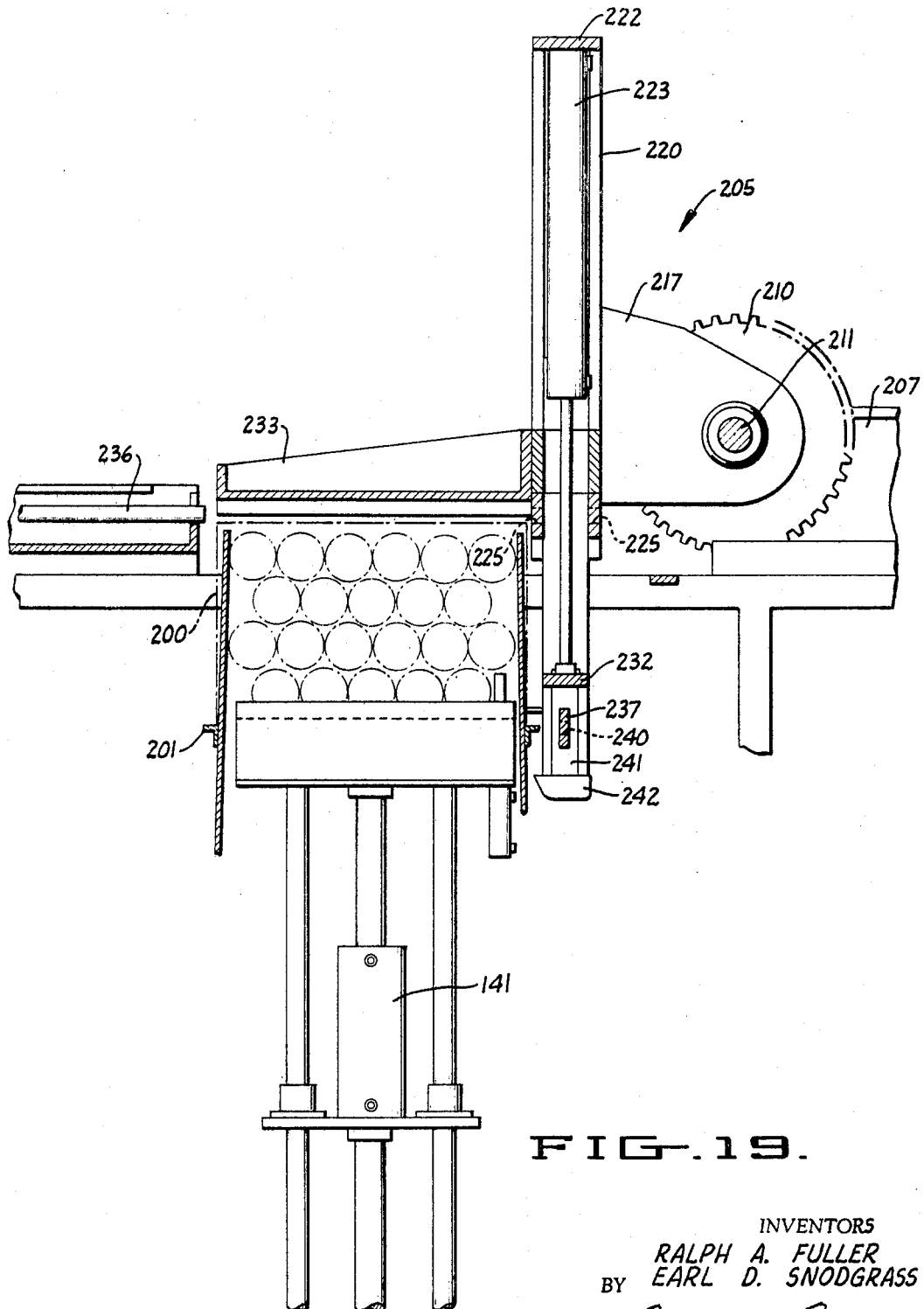

FIG. 19 is a sectional side elevational view, similar to FIGS. 14 and 16, showing the roll-over mechanism associated with the article press-out section in position to support a carton for insertion of packed articles thereinto.

FIG. 20 is a sectional view taken on plane 20—20 of FIG. 16.

FIG. 21 is a sectional view taken on plane 21—21 of FIG. 20.

FIGS. 22, 23, and 24 are sectional views taken on planes 22—22, 23—23 and 24—24, respectively, of FIG. 21.

FIG. 25 is a sectional elevational view of the roll-over mechanism head, with parts broken away, in condition to discharge a packed carton. The phantom lines in this figure illustrate the head in the condition thereof immediately preceeding the discharge condition.

Figure 1:
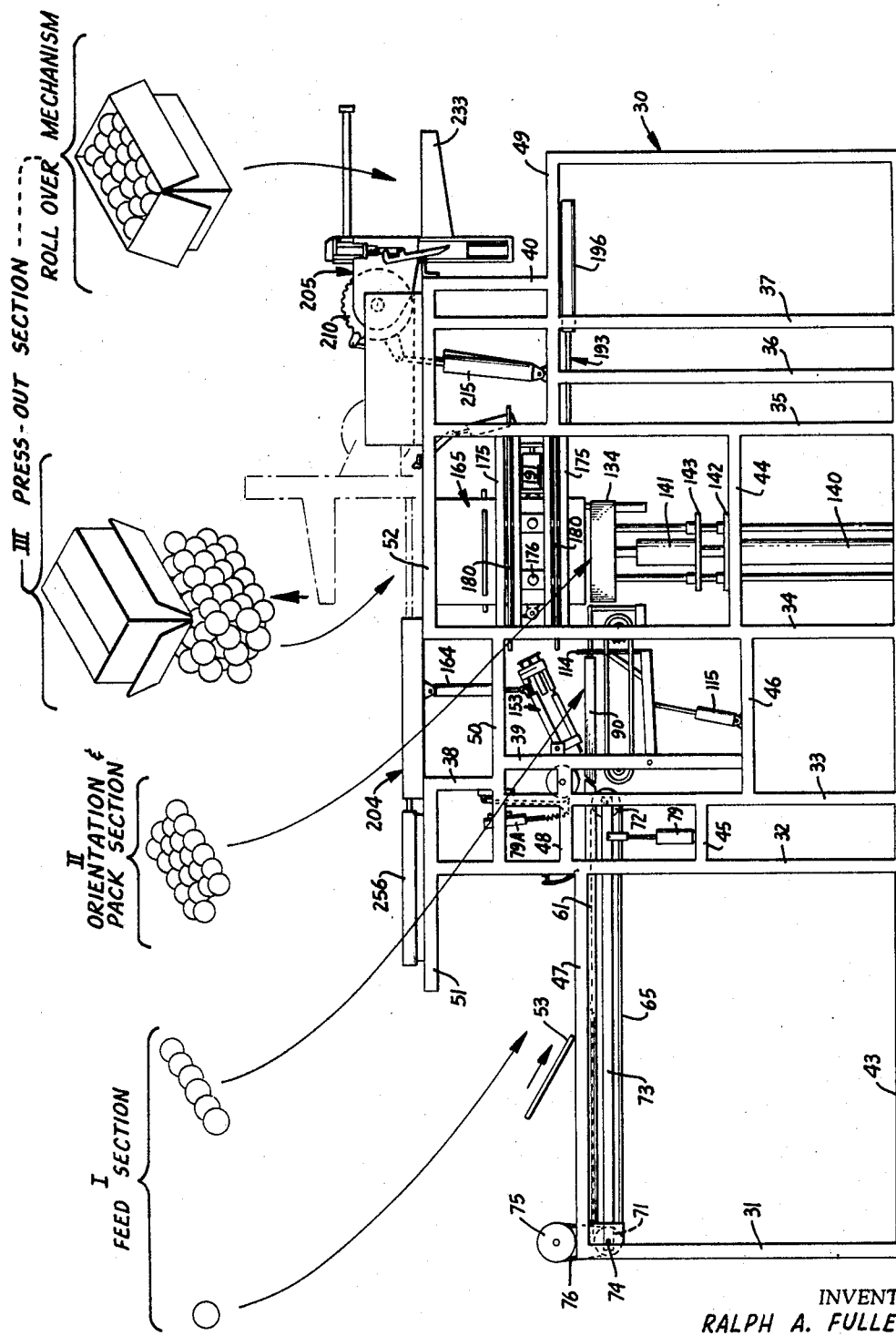
FIG. 1 is a side elevational view diagrammatically illustrating the entire machine. The perspective views in this figure diagrammatically illustrate the state of the articles being packed and the container therefor at the various sections or stages of the machine.

FIG. 26–A is a diagrammatic side elevational view of the FIG. 1 machine illustrating the article orientation and pack section and the article press-out section and the control and actuating structure incorporated thereinto.

FIG. 26–B is a diagrammatic side elevational view forming a continuation of the view in 26–A and illustrating the actuating and control structure for the article press-out section, including the roll-over mechanism.

Figure 27:
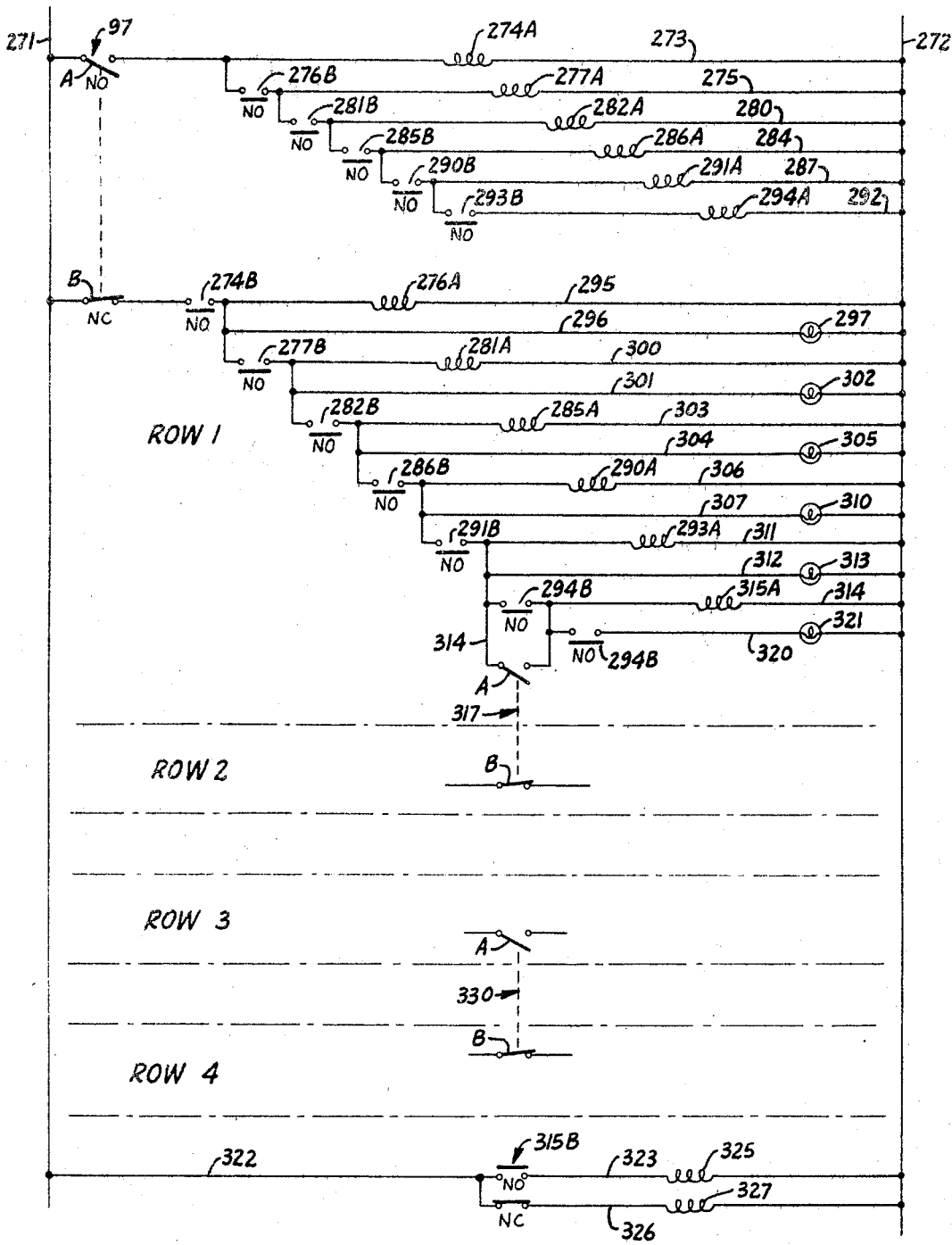

FIG. 27 is an electrical schematic illustrating the article count circuitry employed in the article feed section of the FIG. 1 machine.

The embodiment of the machine illustrated and described herein is especially designed for the place packing of oranges in cartons of eighty-eight (88) oranges each. In this packing, the oranges are arranged in four layers of twenty-two (22) articles each, with each layer comprising four staggered rows. Alternate rows in each layer include a count of four and five, respectively. It is to be understood that the invention is not intended to be limited to the packing of oranges, nor to the specific count and layer arrangement of the illustrated and described machine.

The machine illustrated throughout the figures includes a fixed support frame designated in its entirety by the numeral 30. As can be seen from FIG. 1, this frame comprises vertical members 31, 32, 33, 34, 35, 36, 37, 38, 39 and 40; and longitudinal members 43, 44, 45, 46, 47, 48, 49, 50, 51 and 52. For the sake of simplicity, axially coextensive frame members are designated by single numerals, even though they may be comprised of more than one element. Corresponding lateral frame members on opposite sides of the machine are also designated by like numerals for the sake of simplicity. The opposed lateral frame members are connected by various transverse members which will be described in the subsequent discussion.

The perspective illustrations in the upper portion of FIG. 1 and the arrow lines leading therefrom diagrammatically illustrate the packing functions of the machine and the sections which accomplish these functions. These sections act sequentially on the oranges being packed and are designated as follows:

(I) Feed section
(II) Orientation and pack section
(III) Press-out section

The latter section has a roll-over mechanism associated therewith.

The diagrammatic perspective illustrations of FIG. 1 illustrate the following operations of the respective sections of the machine:

(I) *Feed section.*—In this section, bulk quantities of oranges to be packed are received and directed into rows of a predetermined count.

(II) *Orientation and pack section.*—In this section, rows of oranges are received from the feed section and directed into layers, each of which layers is comprised of a plurality of said rows arranged in staggered relationship. During each pack in this section, a predetermined plurality of such layers are formed; directed into parallel abutting relationship, and laterally confined to effect a tight pack.

(III) *Press-out section.*—In this section the confined layers of oranges are displaced from the orientation and pack section into a carton like container. The operation of this section in the preferred embodiment of the invention illustrated is completed by operation of the associated roll-over mechanism. This mechanism functions to invert the packed container to an upright position.

The detailed construction and operation of each of the foregoing sections will become more apparent from the subsequent detailed description. For the sake of clarity, this description will be divided into sections corresponding in title to the machine sections.

(I) FEED SECTION

The first portion of this section comprises a feed chute 53 (see FIG. 1) directed to four open-bottomed troughs 55, 56, 57 and 58 (see FIG. 5). Each of these troughs is defined by a pair of parallel spaced inverted V-shaped channels 61 fixed to the frame 30 in horizontally disposed relationship. The open bottoms of the troughs 55, 56, 57 and 58 have disposed immediately therebelow continuous belt conveyors 65, 66, 67 and 68, respectively. These conveyors are each trained at the opposite ends thereof over sheaves 71 and 72 (see FIG. 1), which sheaves are rotatively mounted in fixed spaced relationship on support beams 73. The sheaves 71 are keyed to a common axle 74, which axle is driven in a clockwise direction (as viewed in FIG. 1) by an electric motor 75 coupled thereto by a continuous belt 76 and a pair of conventional driving and driven sheaves (not illustrated). Through this arrangement, the upper reach of each of the conveyors 65–68, inclusive, is continuously driven to the right (as viewed in FIG. 1).

Figure 3:
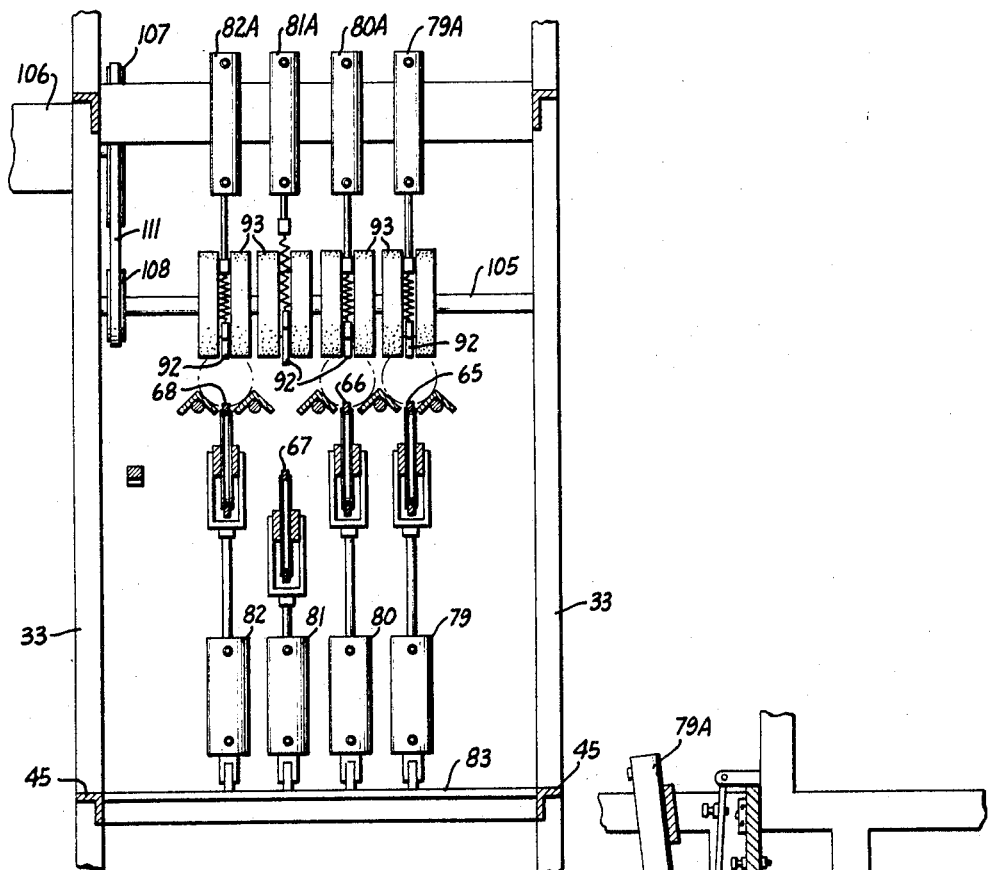
FIG. 3 is a sectional view taken on plane 3—3 of FIG. 2.

The ends of the beams 73 on which the sheaves 71 are mounted are supported on the frame 30 for pivotal movement about a horizontal axis concentric with that of the axle 74. Thus, the beams 73 are supported for pivotal movement in a vertical plane without disturbing the position of the sheaves 71 or the driving relationship thereof with the motor and belt 75 and 76, respectively. The ends of the beams 73 on which the sheaves 72 are mounted are supported for selective vertical raising and lowering through means of pneumatic cylinders 79, 80, 81 and 82. These cylinders, as can be best seen from FIG. 3, are pivotally secured to a transverse frame member 83 fixed to and extending between the horizontal frame members 45. The piston rods of the cylinders 79–82, inclusive, are pivotally secured to the beams 73 to complete the supporting arrangement therefor.

The cylinders 79–82, inclusive, are double acting so that they may be selectively actuated to either raise or lower the belt conveyors supported thereby. Furthermore, these cylinders and the associated belt conveyor support structure are so dimensionally characterized that the conveyors pass partially into the troughs thereabove upon cylinder extension. Thus, through selective extension of the cylinders, any one or more of the belt conveyors may be positioned to impart movement to oranges received in the troughs thereabove. To assure this movement, the troughs are so dimensioned relative to the oranges to be supported thereby that the oranges nest between the channels defining the troughs, but do not pass through the troughs. These dimensional characteristics are exemplified in FIG. 3.

Through the aforedescribed trough and conveyor structure, bulk oranges fed to the machine on the chute 53 are directed into rows. The oranges in these rows are then driven to the portion of the feed section downstream of the belt conveyors 65–68, inclusive. This portion, as can be best seen from FIGS. 2 and 5, includes a plurality of of open-bottomed troughs 84, 85, 86 and 87, aligned with the troughs 55, 56, 57 and 58, respectively. The troughs 84–87, inclusive, are defined by inverted V-shaped channels 90 corresponding in transverse dimensional characteristics to the channels 61. The channels 90 differ from the channels 61, however, in that they are mounted for longitudinal slidable movement on bars 91 fixed to the frame 30. Through this slidable mounting arrangement, the channels 90 may be selectively moved from a position juxtaposed in alignment with the channels 61 (see FIGS. 2 and 5) to a position in the orientation and pack section (see FIG. 8). The means to effect this movement will be developed subsequently.

When the channels 90 are juxtaposed to the channels 61, as shown in FIG. 2, oranges being acted upon by the belt conveyors 65, 66, 67 and 68 are driven to the troughs 84, 85, 86 and 87, respectively. During this movement, each of the oranges passes against a count-trip arm 92 and beneath an over-spin roller 93. As can be seen from FIG. 3, individual count-trip arms 92 and over-spin rollers 93 are provided at the downstream end of each of the conveyors, 65 to 68, inclusive.

The count-trip arms 92 each comprise a lever 94 pivotally secured to the frame 30 by ears 95 for movement about a horizontal axis extending transversely of the machine. Each lever 94 has an adjustable stop 100 mounted in the path thereof on a transverse frame member 101. This movement is also resiliently restricted by an adjustable spring 102 mounted between the lever 94 and the frame member 101.

The count-trip arm assembly at the end of each of the conveyors is completed by pneumatic deactivating structure adapted to selectively lock each of the trip arms in a position blocking the passage of oranges thereby. This structure, as can be seen from FIGS. 2 and 3, comprises a plurality of double acting pneumatic cylinders 79–A, 80–A, 81–A and 82–A; and tension coil springs 103 connected between the piston rods of these cylinders and the lower end portions of each of the levers 94. The assigning of numbers differing from each other only by a postscript to cylinders indicates that the cylinders are simultaneously activated. Accordingly, the cylinders 79, 80, 81 and 82 are activated simultaneously with the cylinders 79–A, 80–A, 81–A and 82–A, respectively. At this point it is noted that the latter cylinders are fixed to a transverse frame member 104.

The over-spin rollers 93 simply comprise soft resilient discs fixed to an axle 105 for rotation therewith. This axle is driven in a counter-clockwise direction, as indicated in FIG. 2, through means of an electric motor 106 and driving and driven sheaves 107 and 108, respectively, operatively joined by a continuous belt 111. In operation, the over-spin rollers function to impact an over-spin to oranges as they leave the conveyors 65–68, inclusive. This over-spin has the effect of driving the oranges to the far right-hand end (as viewed in FIG. 2) of the troughs 84–87, inclusive.

In operation of the feed section, each orange directed against and past one of the count-trip arms 92 functions to trigger the limit switch 97 associated therewith. To assure that each orange functions to trigger the limit switch once, flexible wiper blades 112 (see FIG. 2) are located upstream of the count-trip arms in a position wherein they wipe across oranges directed to the arms by the conveyors. The purpose of these blades is simply to space the oranges directed to the count-trip arms.

The limit switches 97 are each coupled to an electrical count and switch mechanism which will be developed subsequently with respect to FIG. 27. Through this mechanism, each limit switch 97 functions to count the number of oranges directed into the trough downstream thereof and limit the number of oranges so directed responsive to the count. This mechanism also provides for the accumulation of a full count in each trough prior to transfer to the article orientation and pack section and the alternating of the count in adjacent troughs in each successive layer or place pack so accumulated. Specifically, in the embodiment illustrated, each layer or place pack is comprised of twenty-two (22) oranges accumulated in the troughs 84–87, inclusive, in four adjacent rows. The count in these adjacent rows, when viewed from one side to the other, varies on successive layers from 5-6-5-6 to 6-5-6-5.

At the end of a count in any one of the troughs 84–87, inclusive, the electrical count and switch mechanism functions to limit the count by retracting the pneumatic cylinders associated with the conveyor and count-trip arm upstream of the trough being limited. For example, when the count in the trough 84 is complete, the cylinders 79 and 79–A are retracted, thus pulling the conveyor 65 downwardly and out of contact with the oranges thereabove and pulling the lever 94 to a position obstructing the passage of oranges thereby (see FIG. 4).

The accumulation of oranges in the troughs 84–87, inclusive, to make up a layer or place pack is provided by swingable stop arm 113 (see FIG. 2) pivoted at one end thereof to the frame member 39 and having at the other end thereof stop fingers 114 adapted to be simultaneously positioned at the downstream end of each of these troughs. Raising and lowering of the stop arm 113 is effected by a double acting pneumatic cylinder 115 pivotally secured to the mid-portion of the stop arm 113. The cylinder 115 normally maintains the stop arm 113 in the limiting position illustrated in FIG. 2. On accumulation of a full layer or place pack of oranges, however, the electric count and switch mechanism associated with the switches 97 functions to activate the cylinder 115 so as to drop the stop arm. When dropped, the arm permits the place pack to be transferred to the orientation and pack section.

After a complete layer or place pack of oranges is accumulated on the troughs 84–87, inclusive, transfer of this pack to the orientation and pack section is accomplished by sliding the troughs to the right (as viewed in FIG. 2) on the bars 91. This operation is effected by the following structure: a double acting pneumatic cylinder 116 fixed to the framework 30; a gear rack 117 secured to the piston of the cylinder 116 in co-extensive relationship with respect thereto; a pinion 120 mounted in driving engagement with the rack 117 on an axle 121 keyed thereto; a pair of sprockets 122 keyed to the axle 121 at the opposed end portions thereof; a second pair of sprockets 123 journalled to the frame members 34 in longitudinal alignment with the sprockets 122 on stub axles 124 secured to the frame members 34; a pair of continuous chains 125 trained around the longitudinally aligned sprockets and 123 a transfer block 126 securely fastened between the lower surfaces of the channels 90 and the upper surfaces of the chains 125; a Z-shaped swing stop 127 journalled to the lower surface of the block 126 and having a plurality of up-standing fingers 130 adapted to assume positions blocking the rear-most ends of the troughs 85–87, inclusive (see FIG. 8); a tension coil spring 131 secured between the block 126 and swing stop 127 to normally urge the stop to the upwardly extended position illustrated in FIG. 8; and, a pair of abutments 132 and 133 fixed to the frame 30 at positions wherein they are adapted to swing the stop 127 to the retracted positions illustrated in FIG. 2 upon movement of the troughs 84–87, inclusive, to either one of its extremities of slidable movement.

Operation of the afore-enumerated transfer structure is effected simply by extension or retraction of the pneumatic cylinder 116. Specifically, to effect the transfer of a layer or place pack to the orientation and pack section, the cylinder 116 is extended, which in turn drives the chains 125 and the troughs attached thereto. During this movement, the swing stop 127 raises to a position preventing the escape of oranges from the troughs upon acceleration. It is noted that prior to this movement, the stop arm 113 is lowered so as not to interfere with movement of the trough. From the subsequent discussion, it will be seen that the lowering of the stop arm 113 triggers extension of the pneumatic cylinder 116. Return of the troughs 85–87, inclusive, to the retracted receiving position illustrated in FIG. 2 is similarly effected simply by retracting the pneumatic cylinder 116.

(II) ORIENTATION AND PACK SECTION

Upon being transferred to the orientation and pack section, the place pack or layer of oranges is disposed above a press-head 134 (see FIG. 8). This press-head, as can be seen from FIG. 7, is comprised of a block having a grooved upper surface 135 adapted to mate with the under surfaces of the channels 90. The press-head 134 is also provided with slots 136 between the grooves formed in the upper surface thereof and with pattern stop passages 137 at the ends of each of said grooves. The press-head 134 is supported for rectilinear vertical movement by primary and secondary double acting pneumatic cylinders 140 and 141, respectively. The primary cylinder 140 is fixedly secured to the frame 30 and has the piston rod thereof secured to the base of the secondary cylinder 141, which in turn has the piston rod thereof connected to the lower surface of the press-head. Guide plates 142 and 143 are fixed to the cylinders 140 and 141, respectively, and have cylindrical bushings 144 thereon slidably received on cylindrical guide rods 145 fixed to and extending downwardly from the lower surface of the press-head. Through this arrangement, either one or both of the cylinders 140 and 141 may be selectively actuated to raise and lower the press-head 134 in a rectilinear path.

Double acting pneumatic stop cylinders 148, 149, 150 and 151 are secured to the press-head 134 in alignment with the passages 137 and have secured to the piston rods thereof pattern stop elements 152 which are adapted to be extended through said openings and into the end portions of the grooves formed in the head surface. In operation, as can be seen from FIGS. 5 and 7, alternate of these stop elements are selectively extended to position the five count rows of oranges received on the press-head in staggered relationship with respect to the six count rows. The operation of the cylinders 148, 149, 150 and 151 is effected simultaneously with the operation of cooperating double acting pneumatic stop cylinders 148–A, 149–A, 150–A, and 151–A, respectively. The latter cylinders are supported on a pattern press-head 153 and each have connected to the piston rod thereof a pattern stop element 154 (see FIG. 6). Each of the stop elements 154 has an upper portion 155 hinged thereto for resilient deflection rearwardly. As will be seen from the subsequent discussion, the resilient hinging of the portions 155 prevents the stop elements 154 from inadvertently damaging oranges disposed thereabove in the orientation and pack section.

From FIGS. 1, 2 and 6, it can be seen that the pattern press-head 153 and its associated support structure comprises the following: a sub-frame member 156; a transverse axle 157 fixed to the frame member 39 and journalled in the sub-frame member 156; a double acting pneumatic cylinder 160 fixed to and extending from the sub-frame member 156 and having the piston rod thereof secured to a support plate 161 mounting the cylinders 148–A to 151–A, inclusive, in transverse alignment; a pair of rods 162 fixed to and extending rearwardly from the plate 161; a pair of tubes 163 fixed to the sub-frame member 156 and slidably receiving the rods 162 therein; and, a double acting pneumatic support cylinder 164 journalled to the frame 30 for movement about a transverse axis and having the piston rod thereon similarly journalled to the cylinder 160. Through this structure, the cylinders 164 and 160 may be utilized to selectively lower and extend, respectively, the pattern press-head. The press-head is shown in the lower and extended condition in FIG. 8. From the latter figure, it can be seen that the cylinder 160 functions to rectilinearly displace the support plate 161.

In operation of the orientation and pack section, both sets of pattern stop elements 152 and 154 are set to mate with a layer of oranges prior to the transfer of the layer to the section. Setting of the stop elements is effected by selective activation of the stop cylinders cooperating therewith. Upon full transfer of a layer of articles to the orientation and pack section by the cylinder 116, the support cylinder 164 is activated into the extended condition, thus moving the pattern press-head 153 to the horizontal position illustrated in FIG. 8. The latter movement, in turn, triggers activation of the cylinder 160 to the extended position illustrated in FIG. 8, which movement in turn triggers actuation of the cylinder 116 to return the troughs 84–87, inclusive, to the feed section. As a result of this sequence, a layer or place pack of oranges transferred to the orientation and pack section is deposited on the upper surface of the press-head 134 in orientated relationship, as seen in FIG. 5. The specifics of the control for the sequence operations of the machine will be developed subsequently with respect to FIGS. 26–A, 26–B and 27.

The orientation and pack section is completed by the following structure which is disposed generally above the press-head 134: a tubular guide 165 disposed in vertical alignment with the press-head 134, which guide is defined by side walls 166, 167, 168 and 169 (see FIGS. 12 and 13); transverse frame members 172 and 173 fixed to and extending between the frame members 34 and 35 in parallel opposed relationship to the sidewalls 166 and 168, respectively; longitudinal frame members 174 and 175 fixed to and extending between the frame members 172 and 173 in opposed parallel relationship to the sidewalls 167 and 169, respectively; rods 176 fixed to and extending outwardly from the sidewalls 166, 167 and 169 slidably through the frame members in opposed parallel relationship to these sidewalls; compression coil springs 177 disposed around the rods 176 between the plates 167 and 169 and the frame members in opposed parallel relationship thereto; moveable rectangular sub-frames 180 comprises of rigidly inter-connected members 181, 182, 183 and 1884, the latter of which members has openings therein slidably received on the rods 176 extending from the sidewall 166; compression coil springs 185 received around the rods 176 between the sidewall 166 and frame member 184; crank arms 186 pivotally secured to the frame members 174 and 175 for movement about fixed vertical axes and having outer end portions pivotally secured to the side members 181 and 182 of the sub-frame 180; cam elements 187 disposed on the inner ends of the arms 186 in slidable engagement with the sidewalls 167 and 169 adjacent thereto; a transverse brace member 190 fixed between the frame members 174 and 175 and having supported thereon the sidewall 168 and a double acting pneumatic cylinder 191, which cylinder has the piston rod thereof secured to the sub-frame member 183; and, vibrators 192 secured to the opposed sidewalls 166 and 168. Through the foregoing structural arrangement, the opposed sidewalls of the tubular guide 165 are mounted for selective movement towards and away from each other and for vibration simultaneous with this movement. To effect movement of the walls towards each other, as illustrated in FIG. 12, it is merely necessary to extend the cylinder 191, thus moving the sub-frame 180 to the right. Vibration of the walls is effected simply by activating the vibrators 192.

The orientation and pack section also includes a forked barrier structure 193 adapted to support layers or place packs of oranges within the tubular guide 165 independent of support by the press-head 134. The barrier structure, as can best be seen from FIG. 5, includes a base member 194 having a plurality of tines 195 extending therefrom in spaced parallel relationship. The tines 195 are so proportioned and arranged that the three centermost are adapted to pass through the slots 136 in the press-head 134 and the two outermost are adapted to pass to either side of the press-head. The latter relationship can be appreciated from FIG. 7, which figure also illustrates that the tines are adapted to support a layer or place pack of oranges thereon without disturbing its rows. Selective movement is imparted to the barrier structure 193 through means of a double acting pneumatic cylinder 196 mounted on the frame 30 and having the piston rod thereof secured to the base member 194 by braces 197. Suitable guide structure (not illustrated) limits the movement of the barrier structure 193 to a rectilinear path wherein the tines 195 are disposed in a position beneath the guide 165 upon extension of the cylinder 196 and in a position removed from the guide upon retraction of the cylinder.

In operation, the barrier structure 193 is normally positioned beneath the tubular guide 165 when a layer of oranges is transferred to the orientation and pack section from the feed section. Upon retraction of the troughs 84-87, inclusive, by the cylinder 116, as hereinbefore described, the secondary cylinder 141 is extended to a position lifting the layer against the undersurface of the tines 195, as illustrated in FIG. 9. At this point, the cylinder 196 is activated to retract the tines and the cylinder 141 is again extended to lift the layer to the position illustrated in FIG. 10. Upon reaching the latter position, the cylinder 196 is activated to extend the tines 195 through the slots and end space provided therefor in the press-head 134. The presshead 134 is then again lowered by the cylinder 141 to the layer receiving position illustrated in FIG. 8. Through repetition of this cycle and the feed cycle preceding it, plural layers of oranges are accumulated in the tubular guide 165, as illustrated in FIG. 10.

Upon the accumulation of three layers of oranges in the tubular guide 165 in the manner hereinbefore described and the raising of a fourth layer to juxtaposition with the lower surface of the tines 195, the cylinder 196 retracts the barrier structure 193 in the usual manner. However, at this point, upon further extension of the cylinder 141, the cylinder 191 is extended while the barrier structure 193 is maintained in retracted position. Through the extension of the cylinder 191, the four layers of oranges in the guide 165 are laterally forced together, as illustrated in FIG. 12, and the operation of the orientation and pack section is complete.

(III) PRESS-OUT SECTION

This section cooperates closely with the orientation and pack section and, as will be seen from the subsequent description, includes many elements in common therewith. Most apparent of these common etlements are the primary and secondary cylinders 140 and 141 and the upper or extension portions of the tubular guide sidewalls 166–169, inclusive. The latter portions are adapted to telescopically receive thereover cartons to be packed and include outwardly extending carton stop elements 201 fixed thereto. The latter elements simply function to limit the degree to which a carton may be telescoped over the walls of the tubular guide 165 (see FIG. 19).

At this point it is noted that the cartons being packed do not, per se, form part of the present invention. For the sake of illustration, these cartons have been illustrated as conventional cardboard boxes having pairs of opposed flaps 202 and 203 closing each end. It is to be understood, however, that the form of these cartons could be varied. For example, in the packing of oranges, it is most likely that the present invention would be used with cardboard orange cartons comprised of telescoping half-sections, each of which is provided on its outer end portion with conventional flaps to effect closure.

In addition to the structure in common with the orientation and pack section, the press-out section also the associated therewith a secondary barrier structure 204 and a roll-over mechanism 205. This structure and mechanism cooperate, as will be seen from the subsequent description, to deliver empty cartons to the press-out section and remove these cartons to a discharge station upon being filled.

The basic roll-over mechanism includes a pair of racks 206 fixed to the frame members 52 in longitudinal alignment therewith. Each of the racks 206 has extending upwardly from the outer edge thereof a co-extensive angle member 207. Gears 210 fixedly inter-connected by a common axle 211 are received on the racks 206 for rolling movement therealong. End portions on the axle 211 extend slidably beneath the upper flange portions on the angle members 207 to maintain the gears 210 and racks 206 in engagement (see FIG. 20). Translation of the gears 210 between the positions illustrated in solid and phantom lines in FIG. 14 is effected by a pair of crank arms 212 and 213 fixed to the axle 211 and a pair of double acting pneumatic cylinders 214 and 215, respectively, operatively engaged with these crank arms. The cylinders 214 and 215 are pivotally supported on the frame 30 by a transverse frame member 216 fixed to and extending between the frame members 49.

Support plates or arms 217 are fixed and extend laterally from the axle 211 at locations between the crank arms 212 and 213 and the gears 210 (see FIG. 15). The arms 217 have fixed thereto a rigid sub-framework comprised of the following elements: channel defining guide members 220 and 211 fixed to the respective arms 217 in spaced parallel relationship; a first transverse member 222 rigidly interconnected between the outermost ends of the members 220 and 221; a double acting pneumatic cylinder 223 rigidly connected to the member 222 and extending between the members 220 and 221 in substantially parallel relationship thereto; a pair of transverse members 224 having aligned apertures 225 therein fixed to and extending between the innermost ends of the members 220 and 221; and, a detent 226 fixed to and extending from the member 220. The aforedescribed sub-framework rigidly connected to the arms 217 has slidably supported thereon for rectilinear movement a rigid carton support structure comprised of the following elements: guide followers 227 slidably received in the channel members defined by each of the guide members 220 and 221 and having formed thereon bifurcated end portions 227a rigidly interconnected by an outwardly disposed brace members 230 which rigidly supports shafts 231 (see FIG. 21); a transverse member 232 rigidly interconnecting the guide followers 227 and having secured to the mid-portion thereof the piston rod of the cylinder 223; and, a carton support bed 233 rigidly interconnecting the guide followers 227 in spaced relationship to the transverse member 232. Through the foregoing interrelationship between the sub-framework rigidly secured to the arms 217 and the carton support structure, it can be seen that activation of the cylinder 223 functions to impart rectilinear movement to the carton support structure relative to the sub-framework.

From the drawings, and particularly FIGS. 14, 16, 21 and 25, it can be seen that the aforedescribed sub-framework and carton support structure of the roll-over assembly are adapted to cooperate with a bifurcated fork structure 234 of the secondary barrier structure 204 to facilitate support of a carton during roll-over. The bifurcated support structure 234 simply comprises rigidly interconnected base and tine elements 235 and 236, respectively. In operation, the tine elements are adapted to be received in the apertures 225 of the transverse members 224 (see FIGS. 18 and 20). When the tines are so received, locking structure cooperates therewith to selectively set limits for the relative positions of the roll-over mechanism sub-framework and carton support structures. The outer extremities of these limits are exemplified by the solid and phantom lines representations of the carton support bed 233 in FIG. 25.

The locking structure cooperating between the subframework and carton structure of the roll-over mechanism can best be seen from FIGS. 15, 16, 21 and 25 and the associated cross-sectional views thereof. This locking structure comprises the following elements: a transverse beam 237 having apertures 240 therein adapted to assume an aligned relationship with the apertures 225 and proportioned to slidably receive the tine elements 236 when in this relationship; a pair of guide blocks 241 fixed to the opposed ends of the beam 237 and slidably received between the bifurcated end portions 227a of the guide follower 227; stop blocks 242 fixed to the ends of the guide blocks 241 so as to abut against the guide members 220 and 221 and the guide follower portions 227a when the roll-over sub-framework and carton support structure move towards each other (see FIGS. 21 and 25); ears 243 fixed to and extending outwardly from the guide blocks 241 and having apertures (not illustrated) therein slidably received on the shafts 231; compression coil springs 244 received around the shafts 231 between the brace members 230 and the ears 243; a latching arm 245 pivotally secured to the guide follower 227 received in the guide member 221 and having a hooked end portion 246 normally urged towards the ear 243 adjacent thereto by a tension coil spring 247; and, a latch disengaging stop 250 fixed to the frame 30 in a position wherein it is adapted to disengage the latching arm from the ear of 243 adjacent thereto when the roll-over mechanism is in the position illustrated in solid lines in FIGS. 14 and 25.

In operation, when the roll-over mechanism is in the condition illustrated in FIG. 14, with the carton support bed lowered, a carton 200 is positioned on the bed in an upright condition with the lower flaps thereof closed and the upper flaps thereof open. Flap retention wings 251 fixed to and extending laterally from the transverse member 232 extend over the upper side flaps 203 to assure that they are maintained in the open condition. After the carton 200 is so positioned on the bed 233, the cylinder 223 is activated to raise the bed 233 to the phantom line position illustrated in FIG. 25, thus forcing the upper end of the carton against the tine elements 236. Upon assumption of the latter position, the cylinders 214 and 215 are retracted to commence roll-over of the carton 200 from the position illustrated in solid lines in FIG. 14 to that illustrated in phantom lines. As this operation commences, the latching arm 245 is released from the disengaging stop 250 and thus the hooked end portion 246 of the arm engages the ear 243 adjacent thereto to lock the carton support and latching structure in the condition illustrated in FIG. 21. When the roll-over mechanism assumes a position approximately mid-way between the solid and phantom line positions illustrated in FIG. 14, the cylinders 214 and 215 are successively deactivated to permit the roll-over mechanism to settle to the phantom line position. At this point, the roll-over mechanism rests on the bifurcated support structure 234 in the condition illustrated in FIG. 16 until four layers of oranges are accumulated in the guide 165. Upon the latter occurrence, the following sequence of operation is effected:

(1) The cylinder 196 is activated to retract the barrier structure 193 and maintain this structure in retracted condition;

(2) The cylinder 191 is activated to compress the guide 165;

(3) The bifurcated fork structure 234 is retracted from the roll-over mechanism as illustrated in FIG. 19 (the structure facilitating this retraction will be described subsequently);

(4) The cylinder 223 is activated to telescope the carton 200 over the guide 165 and against the stops 201, as illustrated in FIG. 19;

(5) The cylinder 140 is activated to raise the layers of oranges in the guide 165 and against the closed end of the carton 200 (during this extension of the cylinder 140, the cylinder 141 is maintained in extended condition);

(6) Simultaneously with the raising activation of the cylinder 140, a double acting pneumatic latching cylinder 140–A mounted on a transverse frame member 253 is activated to swing a latching arm 254 into engagement with the detent 226;

(7) Also simultaneously with the raising activation of the cylinder 140, the vibrators 192 on the guide walls 166 and 168 are activated and the cylinder 223 is deactivated;

(8) After the completion of steps 6 and 7, above, the cylinder 140 is extended to a position wherein it forces the carton support bed to the position illustrated in FIG. 16 through lifting of the layers of oranges and the carton 200 therearound;

(9) The bifurcated support structure 234 at this time is returned to the position illustrated in FIG. 16 (during this movement, the tine elements 236 pass through the slots 136 in the press-head 134);

(10) Upon reaching the latter condition, the roll-over mechanism 205 is in condition to return the carton to the upright position illustrated in FIG. 14.

It is noted that when the tine elements 236 are engaged in the roll-over mechanism as illustrated in FIG. 16, the transverse beam 237 is locked to the transverse members 224, thus restricting the carton support bed 233 against downward movement. However, when the tine elements 236 are retracted from the roll-over mechanism as illustrated in FIG. 19, the transverse beam 237 is released from the transverse members 224 to permit the bed 233 to lower.

Referring now to FIGS. 16 and 17, therein is illustrated the activating mechanism of the secondary barrier structure 204 adapted to selectively extend and retract the bifurcated fork structure 234. This mechanism includes: a double acting pneumatic cylinder 256 mounted on the frame members 51 and having a piston rod 257; a rectangular box defined by a bottom wall 259 secured to the frame members 51, flanged sidewalls 260 and 261, and end walls 262 and 263; and, a saddle 264 secured to the piston rod 257 and slidably received between the sidewalls 260 and 261 beneath the flanges thereof. The end wall 262 is formed therethrough an opening 265 slidably receiving the piston rod 257. The end wall 263 has formed therein and extending through the upper edge thereof slots 266 adapted to loosely receive the tine elements 236 (see FIG. 17). Receipt of the tine elements 236 in the slots 266 is facilitated by cut-away portions 267 provided in the flanges of the sidewalls 260 and 261 to permit the passage of the base element 235 thereby. The saddle 264 is a channel-shaped cross-section and is adapted to securely receive the base element 235 when the bifurcated fork structure is in the position illustrated in FIG. 16. Receipt of the fork structure in the saddle 264 is facilitated by slots 270 formed in the leg thereof opposed to the end wall 263. The slots 270 are similar to the slots 266 in that they are proportioned and positioned to loosely receive the tine elements 236.

From the foregoing description of the secondary barrier structure 204, its operation is believed apparent. Specifically, when the fork structure 234 is received in the saddle 264 as illustrated in FIGS. 16 and 17, retraction of the structure is accomplished simply by retracting the cylinder 256. Extension of the fork structure 234 is similarly effected by extending the cylinder 256. When the fork structure is in the extended position, the cut-away portions 267 and slots 266 and 270 permit its unrestricted movement with the roll-over mechanism 205.

COUNT AND PATTERN CHANGE CIRCUIT

Referring now to FIG. 27, therein is illustrated a schematic diagram showing the counting circuit associated with one of the counting limit switches 97 and the interrelationship of this circuit with the circuits associated with the other counting switches 97 and the pattern change circuit. For the sake of simplicity, only one count switch circuit has been shown in its entirety, since the other circuits correspond identically thereto. It will be recalled that a separate counting circuit is provided for each of the four rows formed in the feed section. As indicated in FIG. 27, the complete circuit shown therein is for row No. 1 and the circuits for rows 2, 3 and 4 are only illustrated to the extent that they cooperate with each other and that of row No. 1.

From FIG. 27, it can be seen that the limit switch 97 is double acting, having a side A normally open and a side B normally closed. The main leads to the illustrated circuit are designated by the numbers 271 and 272. The illustrated counting circuit for row No. 1 is disposed between the main leads and, for the sake of clarity, is schematically divided into sections connected to the sides A and B of the switch 97. In these sections, the coils and switches of unitary latching relays are separated and designated by the same numeral followed by the postscripts A and B, respectively.

The section of the row No. 1 circuit cooperating with side A of switch 97 comprises the following: a lead 273 connected between the leads 271 and 272 and having interposed therein side A of switch 97 and a latching relay coil 274–A; a lead 275 connected between the lead 273 and the lead 272 and having interposed therein a latching relay switch 276–B and a latching relay coil 277–A; a lead 280 connected between the lead 275 and the lead 272 and having interposed therein a latching relay switch 281–B and a latching relay coil 282–A; a lead 284 connected between the lead 280 and the lead 272 and having interposed therein a latching relay switch 285–B and a latching relay coil 286–A; a lead 287 connected between the lead 284 and the lead 272 and having interposed therein a latching relay switch 290–B and a latching relay coil 291–A; and, a lead 292 connected between the lead 287 and the lead 272 and having interposed therein a latching relay switch 293–B and a latching relay coil 294–A.

The section of the row No. 1 circuit cooperating with side B of switch 97 comprises the following: a line 295 connected between the lines 271 and 272 and having interposed therein side B of switch 97, a latching relay switch 274–B and a latching relay coil 276–A; a line 296 connected between the line 295 and the line 272 and having interposed therein an indicator light 297; a line 300 connected between the line 296 and the line 272 and having interposed therein a latching relay switch 277–B and a latching relay coil 281–A; a line 301 connected between the line 300 and the line 272 and having interposed therein an indicator light 302; a line 303 connected between the line 301 and the line 272 and having interposed therein a latching relay switch 282–B and a latching relay coil 285–A; a line 304 connected between the line 303 and the line 272 and having interposed therein an indicator light 305; a line 306 connected between the line 304 and the line 272 and having interposed therein a latching relay switch 286–B and a latching relay coil 290–A; a line 307 connected between the line 306 and the line 272 and having interposed therein an indicator light 310; a line 311 connected between the line 307 and the line 272 and having interposed therein a latching relay switch 291–B and a latching relay coil 293–A; a line 312 connected between the line 311 and the line 272 and having interposed therein an indicator light 313; a line 314 connected between the line 312 and the line 272 and having interposed therein a latching relay switch 294–B, a latching relay coil 315–A, and side A of a mechanically operated limit switch 317; a line 320 having interposed therein an indicator light 321 and the latching relay switch 294–B (the latter switch corresponds to the latching relay switch 294–B interposed in line 314); a line 322 connected to the line 271; a line 323 connected between the line 322 and the line 272 and having interposed therein the normally open side of a double acting latching relay switch 315–B and a valve activation coil 325 for the retraction side of cylinders 79 and 79–A cooperating with row No. 1 (see FIG. 2); and, a line 326 connected between the line 322 and the line 272 and having interposed therein the normally closed side of the double acting latching relay switch 315–B and a valve activation coil for the extension side of the cylinders 79 and 79–A cooperating with row No. 1. At this point it is noted that side B of the double acting limit switch 317 is connected across a portion of the row No. 2 circuit corresponding identically to the row No. 1 circuit across which side A is connected. Thus, when the switch 317 is acting to close the portion of the row No. 1 circuit in which it is connected, it is acting to open the corresponding portion of the row No. 2 circuit, and vice versa. A double acting limit switch 330 having sides A and B is similarly connected between the circuits for row No. 3 and row No. 4. The switches 317 and 330 are activated by pattern stop cylinder 150–A so that sides A and B thereof are simultaneously activated to either the open or closed position.

In operation of the aforedescribed circuit for row No. 1, each orange passing beneath the count-trip arm 92 functions to first simultaneously close and open sides A and B, respectively, of the switch 97 and then to simultaneously close and open sides B and A, respectively, of the switch 97. As a result, the first orange passing beneath the count-trip arm 92 functions to close latching relay switches 274–B and 276–B. The second, third and fourth oranges passing beneath the count-trip arm 92 similarly to close the latching relay switches through switch 290–B. At this point, if side A of switch 317 is in the open condition illustrated, passage of orange number five beneath the count-trip arm 92 functions to close the latching relay switches 291–B and 293–B. Orange number six passing beneath the count-trip arm 92–B then functions to move latching relay switch 315–B to a position energizing valve activation coil 325 and de-energizing valve activation coil 327. Upon the later occurrence, the cylinders 79 and 79–A are retracted, thus deactivating conveyor 65 of row No. 1 and pulling the count-trip arm 92 to a position preventing further oranges from passing thereby (see FIG. 4). From this operation, it can be seen that with side A of the switch 317 in the open condition, a row count of six is provided.

When side A of switch 317 is in the closed condition, the operation of the row No. 1 count circuit corresponds to that described above through the counting of the fourth orange. However, upon the passing of the fifth orange beneath the count-trip arm 92, the following occurs:

(1) Latching relay switch 291–B is closed;
(2) Latching switch 293–B is closed; and
(3) Latching switch 315–B is moved to a position energizing the valve activation coil 325 and de-energizing the valve activation coil 327.

Figure 4:
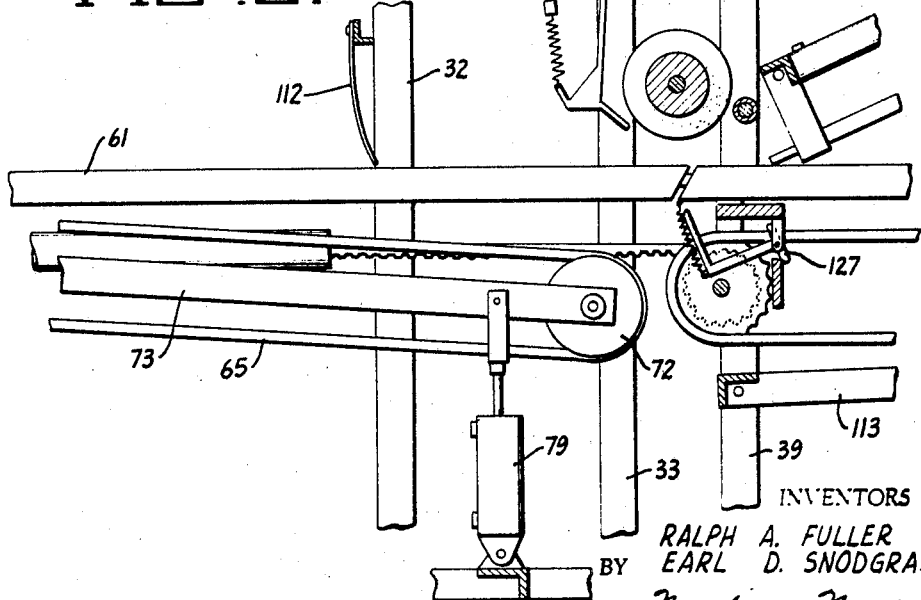
FIG. 4 is a sectional side elevational view similar to FIG. 2, with parts broken away, showing the machine after counting a complete layer of articles.

Thus, after a count of five, the cylinders 79 and 79A are retracted to the positions illustrated in FIG. 4 and the passage of further oranges into the row is prevented.

Since the switches 317 and 330 function to close alternate row circuits, it can be seen that adjacent rows of each layer or place pack will have varying orange counts of five and six. Furthermore, from the following description, it will be seen that the position of the switches 317 and 330 is changed for each successive layer packed. Accordingly, opposed layers will be comprised of opposed rows having varying counts of five and six.

OVERALL OPERATION

Referring now to FIGS. 26–A and 26–B, therein the entire machine and its actuating and control components are diagrammatically illustrated. For the sake of simplicity, the operation of the machine will be described primarily with reference to these figures.

Bulk quantities of oranges are first fed to the feed section where they are directed past the count-trip arms 92 and into rows. As each orange passes one of the count-trip arms 92, the switch 97 cooperating therewith and its associated count circuit functions to record the number of oranges accumulated in the row monitored thereby. The count recorded in each row is visually indicated by indicator lights in the count circuit therefor. In the case of the row No. 1 count circuit illustrated in FIG. 27, these indicator lights are designated by the numerals 297, 302, 305, 310, 313 and 321. After the orange count in each of the four rows in the feed section is complete, whether it be five or six, the conveyor and count deactivation cylinders cooperating therewith are retracted to prevent further oranges from entering the row. For example, when the count in row No. 1 is complete, the cylinders 79 and 79–A are retracted through activation of the switch 315–B (see FIG. 27) and the valve activation coil 325 cooperating therewith. The cylinders 80, 80–A; 81, 81–A; and 82, 82–A are similarly retracted upon completion of the orange count in the row associated therewith.

After the count in all four rows of a layer formed in the feed section is complete, the cylinder 115 is retracted to lower the stop arm 113. Upon being so lowered, the stop arm 113 trips a limit switch 331 which actuates the cylinder 116 to extend the rack 117, thus transferring the orange supporting troughs 84, 85, 86 and 87 to the orientation and pack section. Full extension of the cylinder 116 trips a limit switch 332 which functions to actuate the cylinder 164 to lower the pattern press-head 153. Lowering of the press-head 153, in turn, trips a limit switch 333 which actuates the cylinder 160 to an extended position. Movement of the cylinder 160 to the extended position functions to trip a limit switch 334, which in turn actuates the cylinder 116 to return the troughs 85, 86, 87 and 88 to the retracted position. Upon returning to the retracted position, the cylinder 116 trips a limit switch 335 which actuates the cylinder 141 to lift the press-head 134 to a position wherein the oranges supported thereon are juxtaposed to the under surface of the tines 195. Upon movement of the press-head to the later position, a limit switch 336 is tripped which, in turn, actuates the cylinder 196 to retract the tines 195. Retraction of the tines 195 triggers a limit switch 338 which, in turn, actuates the cylinder 141 to lift the press-head 134 to a position wherein the slots 136 therein are in alignment with the tines 195. Upon lifting of the press-head 134 to the latter position, a limit switch 340 is tripped, which in turn activates the cylinder 196 to extend the tines 195 to a position supporting thereabove the oranges lifted by the press-head 134.

Upon extension of the tines 195 to the orange supporting position, a limit switch 341 is tripped which, in turn, activates the following cylinders to return to the positions illustrated in FIG. 26–A:

(1) Cylinder 141;
(2) Cylinders 79–82, inclusive, and cylinders 79–A—82–A, inclusive; and
(3) Cylinder 164.

Upon retraction of the cylinder 164 to lift the pattern press-head 153 to the position illustrated in FIG. 26–A, a limit switch 342 is tripped, which in turn activates the cylinder 115 to raise the stop arm 113. The tripping of the limit switch 341 also functions to break the row count circuit and return the latching relays therein to the condition illustrated in FIG. 27. In addition, the limit switch 341 functions in cooperation with the limit switch 333 to change the pattern position of the cylinders 148 to 151, inclusive, and 148–A to 151–A, inclusive. At this point it is noted that the switch 333 functions to change a pattern control valve for the latter cylinders each time the pattern press-head 153 is lowered, but that activation of these cylinders through this valve is not effected until the switch 341 is tripped. Activation of the cylinders 148–A to 151–A, inclusive, functions to trigger the switches 317 and 330 to alternate the row count circuits as described previously with respect to FIG. 27.

Upon completion of the foregoing sequence, one layer or place pack of oranges is disposed above the tines 195 and the feed section and orientation and pack section are in condition for the formation of another layer. At this point, the entire sequence is repeated until the desired number of layers are formed and supported above the tines 195. In the embodiment illustrated, the sequence is carried out four times to effect the formation of four layers. As each layer is lifted by the press-head 134, a double acting count limit switch 343 is tripped. This limit switch corresponds in construction to the aforedescribed switch 97 and is associated with a count circuit similar to that shown in FIG. 27 for the counting of oranges in row No. 1. The count circuit associated with the switch 343 differs from that for row No. 1 in that its operation is complete after a count of four and no switch, such as the switch 317, is provided to vary successive counts. It is noted that the switch 343 effects one count on the circuit therefor each time the press-head 134 is raised to a position wherein the oranges supported thereon are juxtaposed beneath the tines 195.

After the count circuit associated with the switch 343 has completed a count of four layers, the cylinder 196 is activated to a position momentarily locking the tines 195 in the retracted position. At this point, a limit switch 344 activates the cylinder 191 to compress the sides of the guide 165. It is noted that although the limit switch 344 is tripped on each raising of the press-head 134, it is so coupled with the count circuit associated with the count limit switch 343 that it only activates the cylinder 191 after four layers have been counted. The activation of the cylinder 191 functions to trip a limit switch 345 which, in turn, actuates the cylinder 256 to retract the bifurcated fork structure 234 into the condition illustrated in FIG. 19. The latter operation is possible because the roll-over mechanism 205 is positioned as shown in FIG. 16 prior to commencement of the packing operation. When so positioned, the roll-over mechanism trips limit switches 346 and 347 shown in FIG. 26–B. The switches 346 and 347 are interposed in the control circuits for the cylinders 140 and 191 to assure that these cylinders will not be activated prior to positioning of the roll-over mechanism as shown in FIG. 16.

Retraction of the bifurcated fork structure 234 by the cylinder 256 trips a limit switch 350 which, in turn, actuates the cylinder 223 to force a carton over the tubular guide 165. Seating of the carton over the guide trips a limit switch 351 which, in turn, simultaneously deactivates the cylinder 223 to an idling position and activates the cylinder 140 and the vibrators 192. Upon the latter occurrence, the cylinder 140 raises the layers of oranges in the guide 165 to an extent displacing the carton to the position illustrated in FIG. 16. During this operation, the cylinder 140 functions to simultaneously force the layers of oranges into the carton and lift the carton support bed 233.

Upon raising of the carton and its contents to the position illustrated in FIG. 16 by the cylinder 140, a limit switch 352 is tripped, which, in turn, activates the cylinder 256 to extend the fork structure 234 into the roll-over mechanism 205. Extension of the fork structure 234 trips a limit switch 353 which, in turn, activates the cylinders 214 and 215 to commence the roll-over operation. As the roll-over operation takes place, limit switches 354 and 355 successively deactivate the cylinders 215 and 214, respectively, and permit the roll-over mechanism to lower to the position shown in phantom lines in FIG. 26–B. Upon assuming the latter position, a limit switch 356 is tripped which, in turn, activates the cylinder 223 to extend the carton support bed 233 to the position shown in FIG. 14, thus permitting the packed carton to be removed.

At the termination of all the foregoing steps, the packing of one carton is complete and removal thereof from the carton support bed 233 may be effected. After removal of the packed carton, the packing of a subsequent carton is initiated simply by placing the empty carton on the support bed 233 as illustrated in FIG. 14 and then actuating the cylinder 223 to raise the bed to the phantom line position shown in FIG. 25. The latter actuation may be effected either by a manual control valve for the cylinder 233 or a limit switch control (not illustrated) actuated by the placing of the empty carton on the bed 233.

Activation of the cylinder 223 to lift the bed 233 functions to trip a limit switch 357 which, in turn, actuates the cylinders 214 and 215 to commence movement of the roll-over mechanism to the position illustrated in FIG. 16. As this movement is effected, limit switches 358 and 359 are sequentially tripped to deactivate the cylinders 214 and 215, respectively, thus permitting the roll-over mechanism to settle to the position illustrated in FIG. 16. Upon reaching of the latter position, the limit switches 352 and 353 are again tripped and the cylinder 140 is retracted to the position illustrated in FIG. 26–A. Retraction of the cylinder 140 to the latter position trips a limit switch 360 which, in turn, activates the cylinder 196 to extend the barrier structure 193. Extension of the barrier structure trips the limit switch 341, which in turn, returns the elements of the feed section and the orientation and pack section to a condition to commence further packing, as described supra.

From the foregoing description, it is believed clear that the present invention provides for the accomplishment of the objects initially set forth herein. It is to be understood, however, that the invention is not intended to be limited to the details of the embodiment described, and the specific exemplary application thereof the packing of oranges, but rather is defined by the following claims.

We claim:

1. A method of packing articles in a container comprising:
   (a) forming a first layer of articles by the following steps:
      (1) feeding the articles into a plurality of rows;
      (2) counting the articles fed into each row;
      (3) limiting the number of articles fed into each row responsive to the number of articles counted thereinto to establish a predetermined article count in each row;
      (4) directing the articles into a coplanar orientation wherein said rows are parallel; and
      (5) positioning each of said rows so that the articles therein are staggered with respect to the articles in the rows adjacent thereto;
   (b) forming a second layer of articles by the following steps:
      (1) feeding the articles into a plurality of rows;
      (2) counting the articles fed into each row;
      (3) limiting the number of articles fed into each row responsive to the number of articles counted thereinto to establish a predetermined article count in each row;
      (4) directing the articles into a coplanar orientation wherein said rows are parellel to each other and opposed and parallel to the rows of said first layer;
      (5) positioning each of said rows forming said second layer so that the articles therein are staggered with respect to the articles in the rows of said layer adjacent thereto and in staggered and abutting relationship to the adjacent articles of said first layer;
   (d) ejecting said articles into a container having interior surfaces defining boundaries corresponding substantially to the lateral boundaries within which said layers were confined while maintained said articles in orientated layers of staggered rows.

2. A method according to claim 1, including imparting vibration to said layers simultaneously with the confining thereof.

3. A method according to claim 1, wherein the articles of said second layer are directed beneath the articles of said first layer.

4. A method according to claim 1, wherein:
   (a) upon being directed into said coplanar orientation the articles in each of said layers rest in horizontal parallel planes; and
   (b) said articles are ejected in a direction substantially normal to said parallel planes.

5. A method according to claim 4, wherein:
   (a) said container comprises an inverted box having an open top; and
   (b) said articles are ejected upwardly into the open top of said box.

6. A method according to claim 5, including turning said box to an upright position subsequent to the injection of said articles thereinto.

7. A method according to claim 1, wherein, in the forming of said first and second layers:
   (a) the number of articles in each row is limited to:
      (1) provide that the number of articles in adjacent rows differ from each other by a factor of one when the rows are directed into a coplanar orientation;
      (2) provide that the number of articles in opposed rows differ from each other by a factor of one when the rows of said second layer are directed into a coplanar orientation opposed and parallel to the rows of said first layer; and
   (b) the positioning of the rows in said first and second layers is effected to center the rows in each layer relative to each other and the opposed rows of the other layer.

8. An apparatus for packing generally spherical or ovaloid articles in a container, comprising:
   (a) an article feed section comprising:
      (1) means to feed articles into a plurality of rows;
      (2) means to count the articles fed into each of said rows;
      (3) means to limit the number of articles fed into each row responsive to the number of articles counted thereinto to establish a predetermined article count in each row;
      (4) means to transfer the articles from said feed section while maintaining the rows thereof;
   (b) an article orientation and pack section, comprising:
      (1) means to receive articles transferred from said feed section and direct said articles into an orientation forming a coplanar layer wherein said rows are parallel;
      (2) means to locate a layer so formed and positioned that additional rows of articles may be received in said article orientation and pack section and formed and positioned into a coplanar layer having parallel rows of staggered articles;
      (3) means to direct layers of articles so formed and positioned into parallel abutting relationship;

(4) means to position the rows in each of said layers so that the articles in adjacent rows in each layer are staggered relative to each other and that the articles in parallel abutting layers are staggered relative to each other;

(5) means to laterally force the articles in said layers towards each other; and (c) an article press-out section comprising:

(1) a container receiver adapted to support a container in an open position opposed to said article orientation and pack section;

(2) means to displace confined layers of articles from said article orientation and pack section and into a container supported by said container receiver while maintaining said articles in orientated layers of staggered rows.

9. An apparatus for packing articles in a container, comprising:

(A) an article feed section comprising:

(1) means to feed articles into a plurality of rows comprising:

(a) a plurality of conveyors, each adapted to discharge articles in one at a time fashion;

(b) a plurality of article receipt troughs adapted to receive articles from said respective conveyors and contain said articles in single file relationship;

(2) means to count the articles fed into each of said rows comprising an article sensing device to sense the number of articles received in each of said troughs;

(3) means to limit the number of articles fed into each row responsive to the number of articles counted thereinto to establish a predetermined article count in each row comprising an article discharge stop associated with each of said conveyors; and (4) means to transfer the articles from said feed section while maintaining the rows thereof comprising a displacement mechanism adapted to move said troughs and the articles received thereon to said article orientation and pack section;

(B) an article orientation and pack section, comprising:

(1) means to receive articles transferred from said feed section and direct said articles into an orientation forming a coplanar layer wherein said rows are parallel;

(2) means to position each of said rows so that the articles therein are staggered with respect to the articles in the rows adjacent thereto;

(3) means to locate a layer so formed and positioned that additional rows of articles may be received in said article orientation and pack section and formed and positioned into a coplanar layer having parallel rows of staggered articles;

(4) means to direct layers of articles so formed and positioned into parallel abutting relationship;

(5) means to laterally force the articles in said layers towards each other; and (C) an article press-out section comprising:

(1) a container receiver adapted to support a container in an open position opposed to said article orientation and pack section;

(2) means to displace confined layers of articles from said article orientation and pack section and into a container supported by said container receiver while maintaining said articles in orientated layers of staggered rows.

10. An apparatus according to claim 9, wherein said means to receive articles from said feed section comprises:

(a) rectilinear members on said troughs defining channels adapted to support said articles thereon in rectilinear single file relationship; and (b) a support engageable with said troughs to maintain the channels defined by said rectilinear members in a substantially parallel coplanar orientation upon movement of said troughs to said article orientation and pack section.

11. An apparatus according to claim 10, wherein said means to position each of said rows comprises:

(a) a first article arrestor having stop elements adapted to be positioned at one end of each of said channels upon movement of said troughs to said article orientation and pack section; and (b) a second arrestor having stop elements adapted to be positioned at the other end of each of said channels upon movement of said troughs to said article orientation and pack section.

12. An apparatus according to claim 11, wherein said displacement mechanism is adapted to return said troughs to said article feed section from said pack section and said means to locate a layer comprises:

(a) a triggering device to activate said displacement mechanism to return said troughs to said article feed section upon positioning of said rows; and (b) a press-head adapted to transport a layer of formed and positioned articles to a location outside the path of articles supported by said troughs while maintaining the relative orientation thereof.

13. An apparatus according to claim 12, wherein said means to direct layers of articles comprises:

(a) a tubular guide positioned to receive therein layers of articles transported by said presshead, and wherein:

(1) said guide and press-head are so associated that the layers assume a position substantially normal to the longitudinal axis of said guide upon being transported thereinto; and (2) said guide is so proportioned relative to the layers received thereinto as to slidably contact the outermost articles in said layers; and (b) a barrier operatively associated with said presshead and guide to support layers of articles received in said guide in parallel abutting relationship and to provide for the receipt of additional layers of articles transported by said press-head.

14. An apparatus according to claim 13 wherein said tubular guide comprises a plurality of opposed individual walls mounted for relative movement towards and away from each other and wherein said means to laterally force the articles in said layers towards each other comprises:

(a) cooperating support structure for said walls adapted to simultaneously effect relative movement of opposed walls towards each other; and (b) vibration creating means associated with said walls to impart vibration thereto simultaneously with the relative movement of opposed walls towards each other.

15. An apparatus according to claim 13, wherein said container receiver comprises:

(a) a tubular extension positioned in coextensive alignment with said tubular guide, said extension having:

(1) article inlet and outlet openings at opposed ends thereof; and (2) an exterior dimensioned to telescopically receive an open container over the end thereof having the outlet opening therein;

(b) stop elements associated with said extension to limit the degree to which a container may be telescoped thereover.

16. An apparatus according to claim 15, wherein:

(a) said tubular guide is open at the end portions thereof to provide article receipt and discharge openings; and (b) the inlet opening of said tubular extension is juxtaposed in aligned relationship to the discharge opening of said tubular guide.

17. An apparatus according to claim 16, wherein said means to displace confined layers of articles comprises a guide and transfer mechanism adapted to direct said press-head against the layers of articles received in said tubular guide and to force said layers through the discharge opening of said guide and said tubular extension into a container received on said extension.

18. An apparatus according to claim 17, including means to trigger displacement operation of said guide and transfer mechanism upon receipt of a predetermined number of layers within said guide.

19. An apparatus according to claim 18, wherein:
 (a) said tubular guide is vertically disposed;
 (b) said tubular extension is vertically disposed above said guide;
 (c) said press-head functions to displace layers of articles upwardly through said guide and extension;
 (d) said container is received on said extension in an inverted condition with the upper end thereof closed; and
 (e) upon displacement of said layers into said container the uppermost of said layers abuts against the closed upper end of said container and functions to lift said container from telescoping receipt on said extension.

20. An apparatus according to claim 19, including:
 (a) a roll-over device adapted to invert said container to an upright condition upon the lifting thereof from said extension; and
 (b) a second barrier operatively associated with said press-head and roll-over device to support said layers within a container upon the lifting thereof from said extension and during inversion by said roll-over device.

21. An apparatus for packing generally spherical or ovaloid articles into a container, comprising:
 (a) an article feed section comprising means to feed articles into a plurality of rows of a predetermined article count and means to transfer articles from said feed section while maintaining the rows thereof;
 (b) an article orientation and pack section, comprising:
  (1) means to receive articles transferred from said feed section and direct said articles into an orientation forming a coplanar layer wherein said rows are parallel;
  (2) means to locate a layer so formed and positioned that additional rows of articles may be received in said article orientation and pack section and formed and positioned into a coplanar layer having parallel rows of staggered articles;
  (3) means to direct layers of articles so formed and positioned into parallel abutting relationship;
  (4) means to position the rows in each of said layers so that the articles in adjacent rows in each layer are staggered relative to each other and that the articles in parallel abutting layers are staggered relative to each other;
  (5) means to laterally force the articles in said layers towards each other; and
 (c) an article press-out section comprising:
  (1) a container receiver adapted to support a container in an open position opposed to said article orientation and pack section;
  (2) means to displace confined layers of articles from said article orientation and pack section and into a container supported by said container receiver while maintaining said articles in orientated layers of staggered rows.

22. An apparatus according to claim 21, including:
 (a) first control means operatively associated with the article feed section to:
  (1) vary the number of articles in the rows of each layer so that adjacent rows differ from one another in count by a unit of one and alternate rows contain the same count;
  (2) vary the number of articles in the rows of respective layers so that opposed rows in adjacent layers differ from one another in count by a unit of one; and
 (b) second control means operatively associated with the means to position each of said rows to:
  (1) center the adjacent rows of each layer with respect to one another;
  (2) center the rows of the respective layers so that opposed rows in adjacent layers are centered with respect to each other.

23. An apparatus for packing articles in a container, comprising:
 (a) an article feed section comprising:
  (1) means to feed articles into a plurality of rows;
  (2) means to count the articles fed into each of said rows;
  (3) means to limit the number of articles fed into each row responsive to the number of articles counted thereinto to establish a predetermined article count in each row;
  (4) means to transfer the articles from said feed section while maintaining the rows thereof;
 (b) an article orientation and pack section, comprising:
  (1) means to receive articles transferred from said feed section and direct said articles into an orientation forming a coplanar layer wherein said rows are parallel;
  (2) means to position each of said rows so that the articles therein are staggered with respect to the articles in the rows adjacent thereto;
  (3) means to locate a layer so formed and positioned that additional rows of articles may be received in said article orientation and pack section and formed and positioned into a coplanar layer having parallel rows of staggered articles;
  (4) means to direct layers of articles so formed and positioned into parallel abutting relationship;
  (5) means to laterally force the articles in said layers towards each other;
 (c) an article press-out section comprising:
  (1) a container receiver adapted to support a container in an open position opposed to said article orientation and pack section;
  (2) means to displace confined layers of articles from said article orientation and pack section and into a container supported by said container receiver while maintaining said articles in orientated layers of staggered rows;
 (d) first control means operatively associated with the means to limit the number of articles fed into each row to:
  (1) vary the number of articles in the rows of each layer so that adjacent rows differ from one another in count by a unit of one and alternate rows contain the same count;
  (2) vary the number of articles in the rows of respective layers so that opposed rows in adjacent layers differ from one another in count by a unit of one; and
 (e) second control means operatively associated with the means to position each of said rows to:
  (1) center the adjacent rows of each layer with respect to one another;
  (2) center the rows of the respective layers so that opposed rows in adjacent layers are centered with respect to each other.

24. A packing apparatus for generally spherical or ovaloid articles, said apparatus comprising:
 (a) an article receiving station;
 (b) means to feed articles from said station into successive layers, each of which is made up of a plurality of said articles arranged in a plurality of side by side coplanar rows;
(c) means to count the articles as they are fed into successive layers;
(d) means to limit the number of articles in the rows of each layer responsive to the count in each row thereof so that:
(1) adjacent rows therein differ from one another in count by a unit of one and alternate rows therein contain the same count; and,
(2) the corresponding rows in successive layers differ from one another in count by a unit of one and the alternate rows in successive layers contain the same count.

25. A packing apparatus according to claim 24, further comprising means to center the rows in each layer relative to each other whereby the articles in adjacent rows in each layer are staggered relative to each other.

26. A method of packing generally spherical or ovaloid articles in a container comprising:
(a) forming a first layer of articles by the following steps:
(1) feeding the articles into a plurality of rows;
(2) counting the articles fed into each row;
(3) limiting the number of articles fed into each row responsive to the number of articles counted thereinto to establish a predetermined article count in each row;
(4) directing the articles into a coplanar orientation wherein said rows are parallel; and
(5) positioning each of said rows so that the articles therein are staggered with respect to the articles in the rows adjacent thereto;
(b) forming a second layer of articles by the following steps:
(1) feeding the articles into a plurality of rows;
(2) counting the articles fed into each row;
(3) limiting the number of articles fed into each row responsive to the number of articles counted thereinto to establish a predetermined article count in each row;
(4) directing the articles into a coplanar orientation wherein said rows are parallel to each other and opposed and parallel to the rows of said first layer;
(5) positioning each of said rows forming said second layer so that the articles therein are staggered with respect to the articles in the rows of said layer adjacent thereto and in staggered and abutting relationship to the adjacent articles of said first layer;
(c) confining said layers of articles in a container having interior surfaces defining lateral boundaries therearound contacting the outermost articles therein while maintaining said articles in orientated layers of staggered rows.

27. A method according to claim 26 wherein in the forming of said first and second layers:
(a) the number of articles in each row is limited to:
(1) provide that the number of articles in adjacent rows differ from each other by a factor of one when the rows are directed into a coplanar orientation;
(2) provide that the number of articles in opposed rows differ from each other by a factor of one when the rows of said second layer are directed into a coplanar orientation opposed and parallel to the rows of said first layer; and
(b) the positioning of the rows in said first and second layers is effected to center the rows in each layer relative to each other and the opposed rows of the other layer.

28. A method of packing generally spherical or ovaloid articles in a container comprising:
(a) forming a first layer of articles by the following steps:
(1) feeding the articles into a plurality of rows of a predetermined article count;
(2) directing the articles into a coplanar orientation wherein said rows are parallel; and
(3) positioning each of said rows so that the articles therein are staggered with respect to the articles in the rows adjacent thereto;
(b) forming a second layer of articles by the following steps:
(1) feeding the articles into a plurality of rows of a predetermined article count;
(2) directing the articles into a coplanar orientation wherein said rows are parallel to each other and opposed and parallel to the rows of said first layer;
(3) positioning each of said rows forming said second layer so that the articles therein are staggered with respect to the articles in the rows of said layer adjacent thereto and in staggered and abutting relationship to the adjacent articles of said first layer;
(c) confining said layers within lateral boundaries so as to force the articles therein towards each other; and
(d) ejecting said articles into a container having interior surfaces defining boundaries corresponding substantially to the lateral boundaries within which said layers were confined while maintaining said articles in orientated layers of staggered rows.

References Cited

UNITED STATES PATENTS

| 2,345,560 | 4/1944  | Albertoli    | 53—164   |
| 2,535,880 | 12/1950 | Tomkins      | 53—164 X |
| 2,826,023 | 11/1958 | Bofinger     | 53—164   |
| 2,857,721 | 10/1958 | Ardell et al.| 53—164 X |
| 2,938,315 | 5/1960  | Voullaire    | 53—247 X |
| 3,292,341 | 12/1966 | Frost        | 53—247 X |

THERON E. CONDON, Primary Examiner

N. ABRAMS, Assistant Examiner

U.S. Cl. X.R.

53—35, 62, 78, 164, 243; 198—40